(12) United States Patent
Dhara et al.

(10) Patent No.: US 7,138,479 B2
(45) Date of Patent: Nov. 21, 2006

(54) ALIPHATIC DIOL POLYCARBONATES AND THEIR PREPARATION

(75) Inventors: Dibakar Dhara, Bangalore (IN); Abbas Alli G. Shaikh, Bangalore (IN); Gautam Chatterjee, Bangalore (IN); C. Seetharaman, Bangalore (IN)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 10/857,789

(22) Filed: May 28, 2004

(65) Prior Publication Data

US 2005/0143554 A1    Jun. 30, 2005

Related U.S. Application Data

(60) Provisional application No. 60/533,659, filed on Dec. 31, 2003.

(51) Int. Cl.
*C08G 64/00* (2006.01)

(52) U.S. Cl. .................. 528/196; 252/299.61; 428/1.1; 528/198; 528/199; 528/204; 528/271; 528/370

(58) Field of Classification Search ........... 252/299.61; 428/1.1; 528/196, 198, 199, 204, 271, 370
See application file for complete search history.

(56) References Cited

U.S. PATENT DOCUMENTS

| | | | |
|---|---|---|---|
| 4,255,301 A | 3/1981 | Minagawa et al. | |
| 4,323,668 A | 4/1982 | Brunelle | |
| 4,506,066 A * | 3/1985 | Medem et al. | 528/196 |
| 5,055,531 A | 10/1991 | Fox et al. | 525/439 |
| 5,747,175 A | 5/1998 | Dietz et al. | 428/480 |
| 6,140,422 A | 10/2000 | Kharaian et al. | 525/176 |
| 6,153,722 A | 11/2000 | Schoenfeld et al. | |
| 6,156,866 A * | 12/2000 | Schuhmacher et al. | 528/196 |
| 6,548,623 B1 | 4/2003 | Brunelle et al. | |
| 6,608,167 B1 | 8/2003 | Hayes et al. | |
| 6,723,395 B1 * | 4/2004 | May et al. | 428/1.1 |

FOREIGN PATENT DOCUMENTS

| | | |
|---|---|---|
| EP | 0033089 A2 | 8/1981 |
| GB | 1079686 | 8/1967 |
| JP | 2003292603 A | 10/2003 |

OTHER PUBLICATIONS

Polymers of Carbonic Acid.22. Cholesteric Polycarbonates Derived from (S)- ((2-Methylbutyl)thio)hydroquinone or Isosorbide. Authors: Kricheldorf, Hans R., Sun; Shih-Jieh; and Gerken, Andreas. Macromolecules 1996, 29, 8077-8082.
Biodegradable Polymers Based on Renewable Resources. VI. Synthesis and Biodegradability of Poly (ester carbonate)s Containing 1,4:3,6- dianhydro-D glucitol and Sebacic Acid Units. Authors: Okada, Masahiko; Yokoe, Makito; and Aoi, Kego. Journal of Applied Polymer Science, vol. 86, 872-880 (2002).
Biodegradable Polymers Based on Renewable Resources. VII. Novel Random and Alternating Copolycarbonates from 1,4:3,6—Dianhydrohexitols and Aliphatic Diols. Authors: Okada, Masahiko; Yokoe, Makito; and Aoi, Kego. Journal of Polymer Science vol. 41, 2312-2321 (2003).
Polymers of Carbonic Acid. XXIV. Photoreactive, Nematic or Cholesteric Polycarbonates Derived from Hydroquinone-4-hydroxybenzoate 4,4'-Dihydroxychalcone and Isosorbine. :Authors: Kricheldorf, Hans R., Sun; Shih-Jieh; Chen, Ching-Ping; Chang, The-Chou. 1997 John Wiley & Sons, Inc. CCC0887-624X/97/091611-19.
New Polymer Synthesis, Thermosetting Cholesterin Oligocarbonates with Propargyl Endgroups. Author: Kricheldorf, Hans R.; Sun, Shih-Jieh, Macromol, Rapid Commun. 18, 551-560 (1997).
Polymers of Carbonic Acid, 23, Photoreactive Cholesteric Polycarbonates Based on Isosorbide, 4,4'-dihydroxychalcone and 4,4'-dihydroxybiphenyl. Authors: Kricheldorf, Hans R.; Sun, Sun, Shih-Jieh. Macromol. Chem. Phys. 198, 2197-2210 (1997).
New Polymers of Carbonic Acid. XXV. Photoreactive Cholesteric Polycarbonates Derived from 2,5-Bis(4'-hydroxybenzylidene)cyclopentanone and Isosorbide. Authors: Sun, Shih-Jieh; Schwarz, Gert; Kricheldorf, Hans R.; Chang, The-Chou. Journal of Polymer Science: Part A: Polymer Chemistry, vol. 37, 1125-1133 (1999).
van Bennekom, A. C. M. , Blends of Amide Modified Polybutylene Terephthalate and Polycarbonate: Phase Separation and Morphology, Polymer, vol. 38, No. 20, (1997), pp. 5041-5049.
Woo, E.M., Morphology and Glass Transition Behavior of Polycarbonate-Phenoxy System: Effects of trans-Reactions in Domain Interface Regions, Journal of Polymer Science: Part A: Polymer Chemistry (1997), vol. 35, pp. 97-103.
Braun, D., Bergmann, M., Polyesters with 1.4:3.6-dianhydrosorbitol as Polymeric Plasticizers for PVC, Angew, Makromol. Chem. 191, 199 (1993).
International Search Report for International Application No. PCT/US2004/042728. Mailed: Apr. 19, 2005.

* cited by examiner

*Primary Examiner*—Terressa Boykin

(57) ABSTRACT

The disclosure provides high quality, low yellowness index copolycarbonates comprising structural units derived from at least one aliphatic diol, at least an aromatic dihydroxy compound and a diaryl carbonate. Also disclosed herein is a method of making such copolycarbonates in presence of one or more catalysts.

42 Claims, 6 Drawing Sheets

Carbonate Region of BPA Homopolycarbonate

Carbonate Region of Isosorbide Homopolycarbonate

Carbonate Region of Isosorbide-BPA Copolycarbonate
(Mole Ratio 50:50)

Carbonate Region of Isosorbide-BPA Copolycarbonate
(Mole Ratio 25:75)

31P NMR Spectrum Copolycarbonate of Isosorbide-BPA $^{31}$P NMR Spectrum of Copolycarbonate of Isosorbide-BPA Possible Structural Variations in a Iso-MS-Iso Polymer Sequence

"KINK"

31P NMR Expts

ALIPHATIC DIOL POLYCARBONATES AND THEIR PREPARATION

This application claims the benefit of the filing date of provisional application U.S. Ser. No. 60/533,659 filed Dec. 31, 2003.

BACKGROUND

This disclosure relates to aliphatic polycarbonates and aliphatic-aromatic polycarbonates and their preparation through melt polymerization.

Polycarbonates are ranked among the most important of the world's engineering thermoplastics. Bisphenol A polycarbonate is currently the most widely used polycarbonate and its world wide annual production exceeds one billion pounds. Polycarbonates are used in hundreds of applications such as eyeglass lenses and optical media, where their transparency and tough physical properties are beneficial. Traditionally, polycarbonates have been prepared either by interfacial or melt polymerization methods. The reaction of an aromatic dihydroxy compound such as bisphenol A (BPA) with phosgene in the presence of water, an organic solvent, an acid acceptor and a catalyst is typical of the interfacial method. The reaction of bisphenol A with a source of carbonate units such as diphenyl carbonate in the presence of a catalyst and the absence of solvent is typical of melt polymerization method. Each method is practiced commercially on a large scale. In many cases, desirable properties can be imparted to polycarbonates by reacting together two or more different aromatic dihydroxy components using the melt or interfacial method to form a copolycarbonate. In such cases, it is often desirable to obtain random incorporation of the different dihydroxy compounds into the polymer to achieve certain desirable physical properties, but this may be difficult to achieve by the melt method in cases where the different dihydroxy compounds happen to have differing reactivity. Random incorporation may be similarly difficult to achieve by the interfacial method when the dihydroxy compounds have differing or unacceptably low solubility in the reaction medium. The efficient production of polycarbonates generally involves a number of trade-offs. For example, one can compensate for low reactivity by increasing catalyst concentration, time or temperature but generally each such measure that one takes to make reaction conditions more "aggressive" involves a penalty in terms of increasing the yellowness of the transparent material.

Copolycarbonates including aliphatic diols such as isosorbide are of great interest to the chemical industry because such aliphatic diols can be produced from renewable resources, namely sugars, rather than from petroleum feed stocks as for most presently used diol monomers. Therefore, it would be desirable to have an efficient method to produce high quality, random, low yellowness copolycarbonates from isosorbides. There have been several previous attempts to produce commercial copolycarbonates from isosobides, but each of these attempts has had its difficulties. Presently, such copolycarbonates are not produced commercially.

Thus it is clear that there is a need for an efficient polymerization process to produce isosobide copolycarbonates having good color properties (i.e., low yellowness) and acceptably high molecular weight for commercial application.

BRIEF SUMMARY OF THE INVENTION

Disclosed herein is composition comprising a copolycarbonate, which copolycarbonate comprises: structural units derived from an aliphatic diol of the formula I:

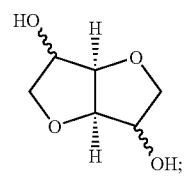

(I)

structural units derived from an aromatic dihydroxy compound of the formula II:

HO-A-OH (II);

and C=O structural units derived from an activated diaryl carbonate of the formula III:

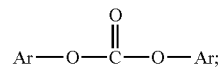

(III)

wherein A is an aromatic radical; Ar is a substituted aromatic radical having 6 to 30 carbon atoms; said copolycarbonate comprises random arrangement of said structural units derived from the aliphatic diol and the aromatic hydroxy compounds; and said copolycarbonate further comprises structural units indicative of the activated carbonate.

In another aspect, a composition comprising a copolycarbonate, wherein the copolycarbonate comprises:
structural units derived from: 1,4:3,6-dianhydro-D-glucitol;
structural units derived from an activated aromatic dihydroxy compound of the formula II:

HO-A-OH (II);

and C=O structural units derived from a activated diaryl carbonate of the formula III:

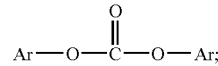

(III)

wherein A is an aromatic radical; Ar is a substituted aromatic radical having 6 to 30 carbon atoms; said copolycarbonate comprises random arrangement of said structural units derived from the aliphatic diol and the aromatic hydroxy compounds, is not liquid crystalline, has a number average molecular weight greater than 7,500, has a Tg of at least 140° C. and has a yellowness index of less than 1.

In yet another aspect, a composition comprising a copolycarbonate, which copolycarbonate consists essentially of structural units derived from one or more aliphatic diols of the formula I:

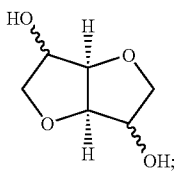

structural units derived from one or more aromatic dihydroxy compounds of the formula II:

and C=O structural units derived from one or more activated diaryl carbonate of the formula III:

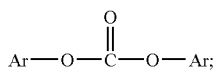

wherein A is an aromatic radical; Ar is a substituted aromatic radical having 6 to 30 carbon atoms; said copolycarbonate comprises random arrangement of said structural units derived from the aliphatic diol and the aromatic hydroxy compounds; and the copolycarbonate further comprises structural units indicative of the activated carbonate.

In another aspect, a method comprising reacting together, in the presence of a catalyst, one or more aliphatic diol of the formula I:

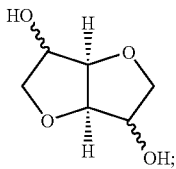

one or more aromatic dihydroxy compounds of the formula II:

and one or more activated diaryl carbonate of the formula III:

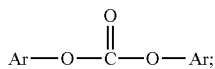

wherein A is an aromatic radical and Ar is a substituted aromatic radical having from 6 to 30 carbon atoms.

In another aspect, a method comprising reacting together in the presence of a catalyst:
1,4:3,6-dianhydro-D-glucitol;
one or more aromatic dihydroxy compounds selected from the group consisting of 4,4'-(3,3,5-trimethylcyclohexylidene)diphenol, 4,4'-bis(3,5-dimethyl)diphenol, 1,1-bis(4-hydroxy-3-methylphenyl)cyclohexane, 1,1-bis(4'-hydroxy-3'methylphenyl)cyclohexane (DMBPC), 4,4'-[1-methyl-4-(1-methyl-ethyl)-1,3-cyclohexandiyl]bisphenol (1,3 BHPM), 4-[1-[3-(4-hydroxyphenyl)-4-methylcyclohexyl]-1-methyl-ethyl]-phenol (2,8 BHPM), 3,8-dihydroxy-5a,10b-diphenylcoumarano-2',3',2,3-coumarane (DCBP), 2-phenyl-3,3-bis(4-hydroxyphenyl)phthalimidine (PPPBP) 4,4-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane (BPA), 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 4,4'-dihydroxydiphenylsulfone (BPS), BPF, 4,4'dihydroxy-1,1-biphenyl, 2,6dihydroxy naphthalene; hydroquinone; resorcinol, $C_{1-3}$ alkyl-substituted resorcinols, 3-4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi[1H-indene]-6, 6'-diol; and
bismethylsalicyl carbonate (BMSC);

wherein the catalyst comprises:
(a) an alpha catalyst selected from the group consisting of alkali metal salts and alkaline earth metal salts: and
(b) a beta catalyst selected from the group consisting of quaternary ammonium compound and a quaternary phosphonium compounds.

In yet another aspect, a composition comprising a copolycarbonate, wherein said copolycarbonate is prepared by reacting together, in the presence of a catalyst, one or more aliphatic diols of the formula I:

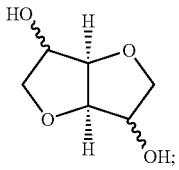

one or more aromatic dihydroxy compounds of the formula II:

and one or more activated diaryl carbonate of the formula III:

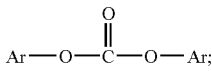

wherein A is an aromatic radical and Ar is a substituted aromatic radical having from 6 to 30 carbon atoms; said copolycarbonate comprises random arrangement of said structural units derived from the aliphatic diol and said aromatic hydroxy compounds; and said copolycarbonate further comprises structural units indicative of the activated carbonate.

In another aspect, a composition comprising a polycarbonate, wherein said polycarbonate is prepared by reacting together, in the presence of a catalyst, one or more aliphatic diols of the formula I:

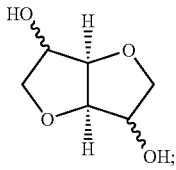
(I)

and one or more activated diaryl carbonate of the formula III:

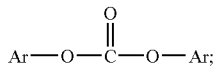
(III)

wherein Ar is a substituted aromatic radical having from 6 to 30 carbon atoms; said polycarbonate comprises random arrangement of said structural units derived from the aliphatic diol and the aromatic hydroxy compounds; and said copolycarbonate further comprises structural units indicative of the activated carbonate.

DETAILED DESCRIPTION

Figure 1:
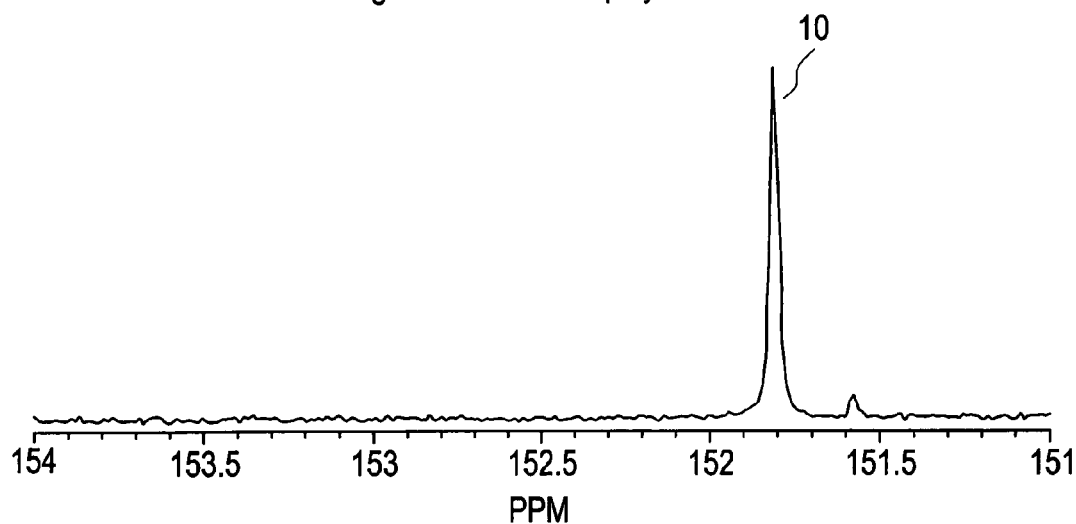
FIG. 1 depicts the carbonate region of a $^{13}C$ NMR spectrum of BPA homopolycarbonate made using the melt method with DPC.

In this specification and in the claims, which follow, reference will be made to a number of terms which shall be defined to have the following meanings.

"BPA" is herein defined as bisphenol A and is also known as 2,2-bis(4-hydroxyphenyl)propane, 4,4'-isopropylidenediphenol and p,p-BPA.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "random arrangement" refers to a copolymer in which the structural units (other than the C=O units joining each monomer) are arranged in an alternating sequence following a statistical distribution, which is independent of the mole ratio of the structural units present in the polymer chain. A procedure is given herein to evaluate a copolycarbonate for randomness. A copolycarbonate that is not perfectly random will still be considered a "random copolymer" if it passes this test.

Isosorbide is also known as 1,4; 3,6-dianhydro-D glucitol and 1,4; 3,6-dianhydrosorbitol.

As used herein, the term "structural units derived from" when used in the context of describing the portions of the copolycarbonates derived from the aliphatic diol and the aromatic dihydroxy compounds refers to the fact that both such monomers lose their respective hydrogen atoms upon incorporation in the polymer. A section of the copolycarbonate might appear as follows:

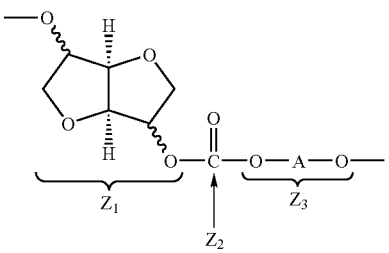

In such case, $Z_1$ is the structural unit derived from an aliphatic diol of formula I, $Z_2$ is a C=O structural unit derived from a diarylcarbonate (which may have been an activated diaryl carbonate) and $Z_3$ is a structural unit derived from an aromatic dihyroxy compound. Fragments of larger chemical structures such as $Z_1$, $Z_2$ and $Z_3$ are also sometimes referred to interchangeable herein as "radicals" or groups".

As used herein the term "activated carbonate" refers to a diaryl carbonate which is typically more reactive (either kinetically or thermodynamically) toward aromatic dihydroxy compounds than diphenyl carbonate under identical conditions. Activated carbonates are typically (but not necessarily) substituted diaryl carbonates.

As used herein the term "structural units indicative of the activated carbonate" means either internal "kinks" in the copolycarbonate or end groups caused by incorporation of a fragment of an activated carbonate such as bismethylsalicyl carbonate (BMSC).

As used herein the term "not liquid crystalline" refers to a polymer that does not exhibit unidirectional molecular alignment.

As used herein the term "natural numbers" means an integer greater than zero (i.e., the series 1, 2, 3, . . . etc.).

As used herein the term "whole number" means the natural numbers and zero (i.e., the series 0, 1, 2, 3 . . . etc.).

As used herein the term "each independently" in the context of describing substituents in a chemical formula means that identically named positions in such a chemical formula that are limited to a set of particular chemical groups are not necessarily both the same chemical group in a particular structure—both positions can be different groups in a particular chemical corresponding to that formula.

Numerical values in the specification and claims of this application, particularly as they relate to polymer compositions, reflect average values for a composition that may contain individual polymers of different characteristics. Furthermore, the numerical values should be understood to include numerical values which are the same when reduced to the same number of significant figures and numerical values which differ from the stated value by less than the experimental error of the measurement technique used in the present application to determine the value.

Disclosed herein is a copolycarbonate comprising structural units derived from at least one aliphatic diol, structural units derived from at least an aromatic dihydroxy compound and a C=O structural unit derived from an activated aromatic carbonate.

The typical aliphatic diols useful in the invention have formula I

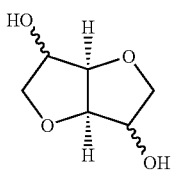

(I)

and are known as hexahydro-furan-3,2-b)-furane-3,6-diols. These diols are prepared by the dehydration of the corresponding hexitols. Hexitols are produced commercially from the corresponding sugars (aldohexose). Aliphatic diols of formula I include 1,4; 3,6-dianhydro-D glucitol, of formula Ia; 1,4; 3,6-dianhydro-D mannitol, of formula Ib; and 1,4; 3,6-dianhydro-L iditol, of formula Ic, and combinations of two or more of the preceding diols.

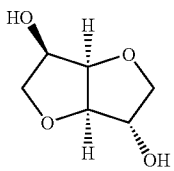

(Ia)

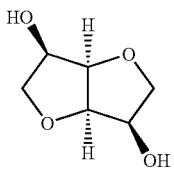

(Ib)

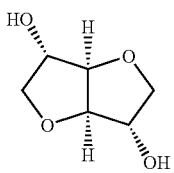

(Ic)

The diol of the formula Ia is generally preferred because it is a rigid, chemically and thermally stable aliphatic diol that tends to produce higher Tg copolymers.

Typical aromatic dihydroxy compounds useful for this application comprise those of the general formula (II):

(II)

wherein A is an aromatic radical.

In some more typical embodiments, the aromatic dihydroxy has the structure of formula IV:

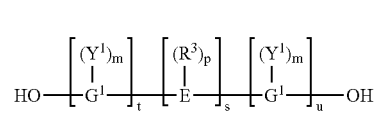

IV wherein each $G^1$ is independently an aromatic group, such as, for example phenylene, biphenylene, naphthylene, etc. E may be an alkylene or alkylidene group such as methylene, ethylene, ethylidene, propylene, propylidene, isopropylidene, butylene, butylidene, isobutylidene, amylene, amylidene, isoamylidene, etc. and may consist of two or more alkylene or alkylidene groups connected by a moiety different from alkylene or alkylidene, such as an aromatic linkage; a tertiary amino linkage; an ether linkage group; a carbonyl linkage group; a silicon-containing linkage group; or a sulfur-containing linkage group such as sulfide, sulfoxide, sulfone, etc.; or a phosphorus-containing linkage group such as phosphinyl, phosphonyl, etc. In addition, E may be a cycloaliphatic group. $R^3$ is hydrogen or a monovalent hydrocarbon group such as alkyl, aryl, aralkyl, alkaryl, or cycloalkyl. $Y^1$ may be an inorganic atom such as halogen (fluorine, bromine, chlorine, iodine); an inorganic group such as nitro; an organic group such as alkenyl, allyl, hydrogen or a monovalent hydrocarbon group, or an oxy group such as OR; it being only desirable that $Y^1$ be inert to and unaffected by the reactants and reaction conditions used to prepare the polymer. The letter m is a whole number from and including zero through the number of positions on $G^1$ available for substitution; p is a whole number from and including zero through the number of positions on E available for substitution; t is a natural number equal to at least one; s is either zero or one; and u is any whole number including zero.

Suitable particular examples of E include cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, etc.; a sulfur-containing linkage, such as sulfide, sulfoxide or sulfone; a phosphorus-containing linkage, such as phosphinyl, phosphonyl; an ether linkage; a carbonyl group; a tertiary nitrogen group; or a silicon-containing linkage such as silane or siloxy.

In the aromatic dihydroxy compound (IV) above, when more than one $Y^1$ substituent is present, they may be the same or different. The same holds true for the $R^3$ substituent. Where s is zero in formula (IV) and u is not zero, the aromatic rings are directly joined with no intervening alkylidene or other bridge (e.g., 4,4'-dihydroxybiphenyl). The positions of the hydroxyl groups and $Y^1$ on the aromatic nuclear residues $G^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some particular embodiments, the parameters t, s, and u are each one; both $G^1$ radicals are unsubstituted phenylene radicals; and E is an alkylidene group such as isopropylidene. In some particular embodiments, both $G^1$ radicals are p-phenylene, although both may be o- or m-phenylene or one o- or m-phenylene and the other p-phenylene.

Some non-limiting examples of aromatic dihydroxy compounds of formula (V) are illustrated by the following list: 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane (bisphenol A); 2,2-bis(3-chloro-4-hydroxyphenyl)propane; 2,2-bis(3-bromo-4-hydroxyphenyl)propane; 2,2-bis(4-hydroxy-3-methylphenyl)propane; 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dimethyl-4-hydroxyphenyl)propane; 2,2-bis(3-chloro-4-hydroxy-5-methylphenyl)propane; 2,2-bis(3-bromo-4-hydroxy-5-methylphenyl)propane; 2,2-bis(3-chloro-4-hydroxy-5-isopropylphenyl)propane; 2,2-bis(3-bromo-4-hydroxy-5-isopropylphenyl)propane; 2,2-bis(3-t-butyl-5-chloro-4-hydroxyphenyl)propane; 2,2-bis(3-bromo-5-t-butyl-4-hydroxyphenyl)propane; 2,2-bis(3-chloro-5-phenyl-4-hydroxyphenyl)propane; 2,2-bis(3-bromo-5-phenyl-4-hydroxyphenyl)propane; 2,2-bis(3,5-disopropyl-4-hydroxyphenyl)propane; 2,2-bis(3,5-di-t-butyl-4-hydroxyphenyl)propane; 2,2-bis(3,5-diphenyl-4-hydroxyphenyl)propane; 2,2-bis(4-hydroxy-2,3,5,6-tetrachlorophenyl)propane; 2,2-bis(4-hydroxy-2,3,5,6-tetrabromophenyl)propane; 2,2-bis(4-hydroxy-2,3,5,6-tetramethylphenyl)propane; 2,2-bis(2,6-dichloro-3,5-dimethyl-4-hydroxyphenyl)propane; 2,2-bis(2,6-dibromo-3,5-dimethyl-4-hydroxyphenyl)propane; 2,2-bis(4-hydroxy-3-ethylphenyl)propane, 2,2-bis(4-hydroxy-3,5-dimethylphenyl)propane, 2,2-bis(3,5,5',5'-tetrachloro-4,4'-dihydroxyphenyl)propane, bis(4-hydroxyphenyl)cyclohexylmethane, 2,2-bis(4-hydroxyphenyl)-1-phenylpropane, 1,1-bis(4-hydroxyphenyl)cyclohexane; 1,1-bis(3-chloro-4-hydroxyphenyl)cyclohexane; 1,1-bis(3-bromo-4-hydroxyphenyl)cyclohexane; 1,1-bis(4-hydroxy-3-methylphenyl)cyclohexane; 1,1-bis(4-hydroxy-3-isopropylphenyl)cyclohexane; 1,1-bis(3-t-butyl-4-hydroxyphenyl)cyclohexane; 1,1-bis(3-phenyl-4-hydroxyphenyl)cyclohexane; 1,1-bis(3,5-dichloro-4-hydroxyphenyl)cyclohexane; 1,1-bis(3,5-dibromo-4-hydroxyphenyl)cyclohexane; 1,1-bis(4'-hydroxy-3'methylphenyl) cyclohexane (DMBPC), 1,1-bis(3,5-dimethyl-4-hydroxyphenyl)cyclohexane; 4,4'-[1-methyl-4-(1-methyl-ethyl)-1,3-cyclohexandiyl]bisphenol (1,3 BHPM), 4-[1-[3-(4-hydroxyphenyl)-4-methylcyclohexyl]-1-methyl-ethyl]-phenol (2,8 BHPM), 3,8-dihydroxy-5a,10b-diphenylcoumarano-2',3',2,3-coumarane (DCBP), 2-phenyl-3,3-bis(4-hydroxyphenyl)phthalimidine (PPPBP) 1,1-bis(3-chloro-4-hydroxy-5-methylphenyl)cyclohexane; 1,1-bis(3-bromo-4-hydroxy-5-methylphenyl)cyclohexane; 1,1-bis(3-chloro-4-hydroxy-5-isopropylphenyl)cyclohexane; 1,1-bis(3-bromo-4-hydroxy-5-isopropylphenyl)cyclohexane; 1,1-bis(3-t-butyl-5-chloro-4-hydroxyphenyl)cyclohexane; 1,1-bis(3-bromo-5-t-butyl-4-hydroxyphenyl)cyclohexane; 1,1-bis(3-chloro-5-phenyl-4-hydroxyphenyl)cyclohexane; 1,1-bis(3-bromo-5-phenyl-4-hydroxyphenyl)cyclohexane; 1,1-bis(3,5-disopropyl-4-hydroxyphenyl)cyclohexane; 1,1-bis(3,5-di-t-butyl-4-hydroxyphenyl)cyclohexane; 1,1-bis(3,5-diphenyl-4-hydroxyphenyl)cyclohexane; 1,1-bis(4-hydroxy-2,3,5,6-tetrachlorophenyl)cyclohexane; 1,1-bis(4-hydroxy-2,3,5,6-tetrabromophenyl)cyclohexane; 1,1-bis(4-hydroxy-2,3,5,6-tetramethylphenyl)cyclohexane; 1,1-bis(2,6-dichloro-3,5-dimethyl-4-hydroxyphenyl)cyclohexane; 1,1-bis(2,6-dibromo-3,5-dimethyl-4-hydroxyphenyl)cyclohexane; 1,1-bis(4-hydroxyphenyl)-3,3,5-trimethylcyclohexane; 1,1-bis(3-chloro-4-hydroxyphenyl)-3,3,5-trimethylcyclohexane; 1,1-bis(3-bromo-4-hydroxyphenyl)-3,3,5-trimethylcyclohexane; 1,1-bis(4-hydroxy-3-methylphenyl)-3,3,5-trimethylcyclohexane; 1,1-bis(4-hydroxy-3-isopropylphenyl)-3,3,5-trimethylcyclohexane; 1,1-bis(3-t-butyl-4-hydroxyphenyl)-3,3,5-trimethylcyclohexane; 1,1-bis(3-phenyl-4-hydroxyphenyl)-3,3,5-trimethylcyclohexane; 1,1-bis(3,5-dichloro-4-hydroxyphenyl)-3,3,5-trimethylcyclohexane; 1,1-bis(3,5-dibromo-4-hydroxyphenyl)-3,3,5-trimethylcyclohexane; 1,1-bis(3,5-dimethyl-4-hydroxyphenyl)-3,3,5-trimethylcyclohexane; 1,1-bis(3-chloro-4-hydroxy-5-methylphenyl)-3,3,5-trimethylcyclohexane; 1,1-bis(3-bromo-4-hydroxy-5-methylphenyl)-3,3,5-trimethylcyclohexane; 1,1-bis(3-chloro-4-hydroxy-5-isopropylphenyl)-3,3,5-trimethylcyclohexane; 1,1-bis(3-bromo-4-hydroxy-5-isopropylphenyl)-3,3,5-trimethylcyclohexane; 1,1-bis(3-t-butyl-5-chloro-4-hydroxyphenyl)-3,3,5-trimethylcyclohexane; 1,1-bis(3-bromo-5-t-butyl-4-hydroxyphenyl)-3,3,5-trimethylcyclohexane; bis(3-chloro-5-phenyl-4-hydroxyphenyl)-3,3,5-trimethylcyclohexane; 1,1-bis(3-bromo-5-phenyl-4-hydroxyphenyl)-3,3,5-trimethylcyclohexane; 1,1-bis(3,5-disopropyl-4-hydroxyphenyl)-3,3,5-trimethylcyclohexane; 1,1-bis(3,5-di-t-butyl-4-hydroxyphenyl)-3,3,5-trimethylcyclohexane; 1,1-bis(3,5-diphenyl-4-hydroxyphenyl)-3,3,5-trimethylcyclohexane; 1,1-bis(4-hydroxy-2,3,5,6-tetrachlorophenyl)-3,3,5-trimethylcyclohexane; 1,1-bis(4-hydroxy-2,3,5,6-tetrabromophenyl)-3,3,5-trimethylcyclohexane; 1,1-bis(4-hydroxy-2,3,5,6-tetramethylphenyl)-3,3,5-trimethylcyclohexane; 1,1-bis(2,6-dichloro-3,5-dimethyl-4-hydroxyphenyl)-3,3,5-trimethylcyclohexane; 1,1-bis(2,6-dibromo-3,5-dimethyl-4-hydroxyphenyl)-3,3,5-trimethylcyclohexane; 4,4-bis(4-hydroxyphenyl)heptane, 4,4'-dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-(3,3,5-trimethylcyclohexylidene)diphenol, 4,4'-bis(3,5-dimethyl)diphenol, 4,4'-dihydroxydiphenylether; 4,4'-dihydroxydiphenylthioether; 1,3-bis(2-(4-hydroxyphenyl)-2-propyl)benzene; 1,3-bis(2-(4-hydroxy-3-methylphenyl)-2-propyl)benzene; 1,4-bis(2-(4-hydroxyphenyl)-2-propyl)benzene, 1,4-bis(2-(4-hydroxy-3-methylphenyl)-2-propyl)benzene 2,4'-dihydroxyphenyl sulfone, 4,4'-dihydroxydiphenylsulfone (BPS), BPF, 2,6-dihydroxy naphthalene; hydroquinone; resorcinol, C1-3 alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi[1H-indene]-6,6'-diol. The most typical aromatic dihydroxy compound is Bisphenol A (BPA).

As used herein the term "activated diaryl carbonate" is defined as a diaryl carbonate that is more reactive than diphenylcarbonate toward transesterification reactions. Such activated diaryl carbonate typically have the formula III:

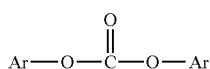

(III)

wherein Ar is a substituted aromatic radical having 6 to 30 carbon atoms. The preferred activated carbonates have the more specific general formula (V):

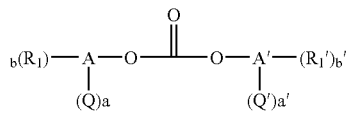

(V)

wherein Q and Q' are each independently an ortho-positioned activating group. A and A' are each independently aromatic rings which can be the same or different depending on the number and location of their substituent groups, and a and a' are whole numbers of zero up to a maximum equivalent to the number of replaceable hydrogen groups substituted on the aromatic rings A and A' respectively, wherein a+a' is greater than or equal to 1. $R_1$ and $R_1'$ are each independently substituent groups such as alkyl, cycloalkyl, alkoxy, aryl, alkylaryl, cyano, nitro, or halogen. The number b is a whole number of from zero up to a maximum equivalent to the number of replaceable hydrogen atoms on the aromatic ring A minus the number a, and the number b' is a whole number of from zero up to a maximum equivalent to the number of replaceable hydrogen atoms on the aromatic ring A' minus the number a'. The number, type and location of the $R_1$ or $R_1'$ subsituents on the aromatic ring is not limited unless they deactivate the carbonate and lead to a carbonate which is less reactive than diphenyl carbonate.

Non-limiting examples of suitable ortho-positioned activating groups Q and Q' include (alkoxycarbonyl)aryl groups, halogens, nitro groups, amide groups, sulfone groups, sulfoxide groups, or imine groups with structures indicated below:

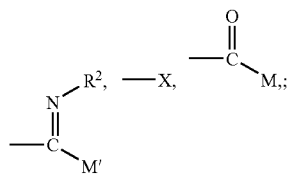

whrein X is halogen or $NO_2$; M and M' independently comprises N-dialkyl, N-alkylaryl, alkyl or aryl; and R2 is alkyl or aryl. Specific and non-limiting examples of activated carbonates include bis(o-methoxycarbonylphenyl)carbonate, bis(o-chlorophenyl)carbonate, bis(o-nitrophenyl) carbonate, bis(o-acetylphenyl)carbonate, bis(o-phenylketonephenyl)carbonate, bis(o-formylphenyl) carbonate. Unsymmetrical combinations of these structures, where the substitution number and type on A and A' are different, are also possible to employ in the current invention. A preferred structure for an activated carbonate is an ester-substituted diaryl carbonate having the structure (X):

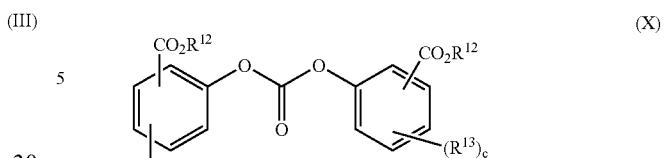

(X)

wherein $R^{12}$ is independently at each occurrence a $C_1$–$C_{20}$ alkyl radical, $C_4$–$C_{20}$ cycloalkyl radical, or $C_4$–$C_{20}$ aromatic radical; $R^{13}$ is independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical; and c is independently at each occurrence an integer 0–4. At least one of the substituents $CO_2R^{12}$ is preferably attached in an ortho position of formula X.

Examples of preferred ester-substituted diaryl carbonates include but are not limited to bis(methylsalicyl)carbonate (CAS Registry No. 82091-12-1) (also known as BMSC or bis(o-methoxycarbonylphenyl)carbonate), bis(ethyl salicyl) carbonate, bis(propyl salicyl) carbonate, bis(butylsalicyl) carbonate, bis(benzyl salicyl)carbonate, bis(methyl 4-chlorosalicyl)carbonate and the like. Typically bis(methylsalicyl)carbonate is preferred for use in melt polycarbonate synthesis due to its lower molecular weight and higher vapor pressure.

Some non-limiting examples of non-activating groups which, when present in an ortho position, would not be expected to result in activated carbonates are alkyl, cycolalkyl or cyano groups. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl) carbonate. Unsymmetrical combinations of these structures are also expected to result in non-activated carbonates.

Unsymmetrical diaryl carbonates wherein one aryl group is activated and one aryl is inactivated would also useful in this invention if the activating group renders the diaryl carbonate still more reactive than diphenyl carbonate.

One method for determining whether a certain diaryl carbonate is activated or is not activated is to carry out a model transesterification reaction between the certain diaryl carbonate with a phenol such as p-(1,1,3,3-tetramethyl)butyl phenol (and comparing the relative reactivity against diphenyl carbonate). This phenol is preferred because it possesses only one reactive site, possesses a low of volatility and possesses a similar reactivity to bisphenol-A. The model transesterification reaction is carried out at temperatures above the melting points of the certain diaryl carbonate and p-(1,1,3,3-tetramethy)butyl phenol and in the presence of a transesterification catalyst, which is usually an aqueous solution of sodium hydroxide or sodium phenoxide. Preferred concentrations of the transesterification catalyst are about 0.001 mole % based on the number of moles of the phenol or diaryl carbonate. And a preferred reaction temperature is 200° C. But the choice of conditions and catalyst concentration can be adjusted depending on the reactivity of the reactants and melting points of the reactants to provide a convenient reaction rate. The only limitation to reaction temperature is that the temperature must be below the degradation temperature of the reactants. Sealed tubes can be used if the reaction temperatures cause the reactants to volatilize and effect the reactant molar balance. The determination of the equilibrium concentration of reactants is accomplished through reaction sampling during the course of the reaction and then analysis of the reaction mixture using a well-know detection method to those skilled in the art such as HPLC (high pressure liquid chromatography). Particular care needs to be taken so that reaction does not continue after the sample has been removed from the reaction vessel. This is accomplished by cooling down the sample in an ice bath and by employing a reaction quenching acid such as acetic acid in the water phase of the HPLC solvent system. It may also be desirable to introduce a reaction quenching acid directly into the reaction sample in addition to cooling the reaction mixture. A preferred concentration for the acetic acid in the water phase of the HPLC solvent system is 0.05 mole %. The equilibrium constant is determined from the concentration of the reactants and product when equilibrium is reached. Equilibrium is assumed to have been reached when the concentration of components in the reaction mixture reach a point of little or no change on sampling of the reaction mixture. The equilibrium constant can be determined from the concentration of the reactants and products at equilibrium by methods well known to those skilled in the art. A diaryl carbonate which possesses a relative equilibrium constant (K diarylcarbonate/K diphenylcarbonate) of greater than 1 is considered to possess a greater reactivity than diphenyl carbonate and is an activated carbonate, whereas a diaryl carbonate which possesses an equilibrium constant of 1 or less is considered to possess the same or lesser reactivity than diphenyl carbonate and is considered not to be activated. It is generally preferred to employ an activated carbonate with very high reactivity compared to diphenyl carbonate when conducting transesterification reactions. Preferred are activated carbonates with an equilibrium constant greater than at least 1000 times that of diaryl carbonate. In some embodiments, one or more activated carbonates may be used as carbonating agents for preparation of the disclosed polycarbonates.

The aliphatic-aromatic copolycarbonates according to the invention typically comprise aliphatic diol at about 1 to about 99 and preferably about 5 to about 99 mole percent and aromatic dihydroxy compound at about 1 to about 99 mole percent based on the total moles of aliphatic diol and aromatic dihydroxy compound present in the polycarbonate. To prepare aliphatic-aromatic copolycarbonates, the aliphatic diols and aromatic dihydroxy compounds have to be polymerized together.

Advantageous catalysts known for use in polycarbonate melt reactions may be used in reactions involving activated carbonates. Known melt catalysts include salts of alkaline earth metals, salts of alkali metals, quaternary ammonium compounds, quaternary phosphonium compounds, and mixtures thereof. It is often advantageous to use a combination of some amount of a salt of an alkaline earth metal and/or an alkali metal (i.e., an "alpha" catalyst) that does not degrade at temperatures used throughout the reaction together with a quaternary ammonium and/or a quaternary phosphonium compound that does degrade at a temperature used in the reaction (i.e., a "beta" catalyst). The total amount of catalyst employed is about $1 \times 10^{-7}$ to about $1 \times 10^{-2}$, and preferably about $1 \times 10^{-7}$ to about $1 \times 10^{-3}$ moles catalyst per total moles of the mixture of aliphatic diol and aromatic dihydroxy compound employed.

Exemplary quaternary ammonium compounds include compounds comprising structure VI

wherein $R^4$–$R^7$ are independently a $C_1$–$C_{20}$ alkyl radical, $C_4$–$C_{20}$ cycloalkyl radical or a $C_4$–$C_{20}$ aryl radical and $X^-$ is an organic or inorganic anion. Suitable anions $X^-$ include hydroxide, halide, carboxylate, sulfonate, sulfate, carbonate and bicarbonate. In one embodiment, the transesterification catalyst comprises tetramethyl ammonium hydroxide.

Exemplary quaternary phosphonium compounds include compounds comprising structure VII

wherein $R^8$–$R^{11}$ are independently a $C_1$–$C_{20}$ alkyl radical, $C_4$–$C_{20}$ cycloalkyl radical or a $C_4$–$C_{20}$ aryl radical and $X^-$ is an organic or inorganic anion. Illustrative anions include hydroxide, halide, carboxylate, sulfonate, sulfate, carbonate, and bicarbonate.

Where $X^-$ is a polyvalent anion such as carbonate or sulfate it is understood that the positive and negative charges in structures VI and VII are properly balanced. For example, where $R^4$–$R^7$ in structure VI are each methyl groups and $X^-$ is carbonate, it is understood that $X^-$ represents $\frac{1}{2}$ ($CO_3^{-2}$).

In one embodiment, the catalyst comprises tetrabutyl phosphonium acetate. In an alternate embodiment, the catalyst comprises a mixture of an alkali metal salt or alkaline earth metal salt with at least one quaternary ammonium compound, at least one quaternary phosphonium compound, or a mixture thereof, for example a mixture of sodium hydroxide and tetrabutyl phosphonium acetate. In another embodiment the catalyst is a mixture of sodium hydroxide and tetramethyl ammonium hydroxide.

In one embodiment, the catalyst is an alkaline earth metal hydroxide, an alkali metal hydroxide or a mixture thereof. Suitable alkaline earth and alkali metal hydroxides are illustrated by calcium hydroxide, magnesium hydroxide, sodium hydroxide and lithium hydroxide.

In another embodiment, the catalyst comprises an alkaline earth metal salt of an organic acid, an alkali metal salt of an organic acid, or a salt of an organic acid comprising both alkaline earth metal ions and alkali metal ions. Salts of organic acids useful as catalysts are illustrated by alkali metal and alkaline earth metal salts of formic acid, acetic acid, stearic acid and ethyelenediamine tetraacetic acid. In one embodiment the catalyst comprises magnesium disodium ethylenediamine tetraacetate (EDTA magnesium disodium salt).

In yet another embodiment, the catalyst comprises the salt of a nonvolatile inorganic acid. By "nonvolatile" it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates. Suitable salts of nonvolatile acids include $NaH_2PO_3$, $NaH_2PO_4$, $Na_2H_2PO_3$, $KH_2PO_4$, $CsH_2PO_4$, $Cs_2H_2PO_4$, or a mixture thereof. In one embodiment, the transesterification catalyst comprises both the salt of a non-volatile acid and a basic co-catalyst such as an alkali metal hydroxide. This concept is exemplified by the use of a combination of $NaH_2PO_4$ and sodium hydroxide as the transesterification catalyst.

The reactants for the polymerization reaction using an activated aromatic carbonate can be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactant may also be done at a later stage of the polymerization reaction. Mixing of the reaction mixture is accomplished by any methods known in the art, such as by stirring. Reactive conditions include time, temperature, pressure and other factors that affect polymerization of the reactants. Typically the activated aromatic carbonate is added at a mole ratio at about 0.8 to about 1.3 and more preferably 0.9 to about 1.1 and all subranges there between, relative to the total moles of aromatic dihydroxy compound and aliphatic diol.

The melt polymerization reaction using an activated aromatic carbonate is conducted by subjecting the above reaction mixture to a series of temperature-pressure-time protocols. In some embodiments, this involves gradually raising the reaction temperature in stages while gradually lowering the pressure in stages. In one embodiment, the pressure is reduced from about atmospheric pressure at the start of the reaction to about 0.01 milibar (1 Pa) or in another embodiment to 0.05 milibar (5 Pa) in several steps as the reaction approaches completion. The temperature may be varied in a stepwise fashion beginning at a temperature of about the melting temperature of the reaction mixture and subsequently increased to about 320° C. In one embodiment, the reaction mixture is heated from room temperature to about 150° C. The polymerization reaction starts at a temperature of about 150° C. to about 220° C., then is increased to about 220° C. to about 250° C. and is then further increased to a temperature of about 250° C. to about 320° C. and all subranges there between. The total reaction time is about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. Efficient removal of the by-product may be achieved by different techniques such as reducing the pressure. Generally the pressure starts relatively high in the beginning of the reaction and is lowered progressively throughout the reaction and temperature is raised throughout the reaction. Experimentation is needed to find the most efficient conditions for particular production equipment.

The progress of the reaction may be monitored by measuring the melt viscosity or the weight average molecular weight of the reaction mixture using techniques known in the art such as gel permeation chromatography. These properties may be measured by taking discreet samples or may be measured on-line. After the desired melt viscosity and/or molecular weight is reached, the final polycarbonate product may be isolated from the reactor in a solid or molten form. It will be appreciated by a person skilled in the art, that the method of making aliphatic homopolycarbonate and aliphatic-aromatic copolycarbonates as described in the preceding sections may be made in a batch or a continuous process and the process disclosed herein is essentially preferably carried out in a solvent free mode. Reactors chosen should ideally be self-cleaning and should minimize any "hot spots." However, vented extruders similar to those that are commercially available may be used.

In one embodiment, the aliphatic homopolycarbonate and aliphatic-aromatic copolycarbonate may be prepared in an extruder in presence of one or more catalysts, wherein the carbonating agent is an activated aromatic carbonate. The reactants for the polymerization reaction can be fed to the extruder in powder or molten form. In one embodiment, the reactants are dry blended prior to addition to the extruder. The extruder may be equipped with pressure reducing devices (e.g., vents), which serve to remove the activated phenol by-product and thus drive the polymerization reaction toward completion. The molecular weight of the polycarbonate product may be manipulated by controlling, among other factors, the feed rate of the reactants, the type of extruder, the extruder screw design and configuration, the residence time in the extruder, the reaction temperature and the pressure reducing techniques present on the extruder. The molecular weight of the polycarbonate product may also depend upon the structures of the reactants, such as, activated aromatic carbonate, aliphatic diol, dihydroxy aromatic compound, and the catalyst employed. Many different screw designs and extruder configurations are commercially available that use single screws, double screws, vents, back flight and forward flight zones, seals, sidestreams and sizes. One skilled in the art may have to experiment to find the best designs using generally known principals of commercial extruder design.

The copolycarbonates of isosorbide with BPA and homopolycarbonate of isosorbide made by the melt route using BMSC or DPC as the carbonate source may discolor when exposed to high temperatures greater than 250° C. Residual catalyst in the polycarbonates may be a potential contributor to the discoloration. To arrest the effect of residual catalyst in the polycarbonate in accelerating formation of color bodies, the residual catalyst may be quenched with calculated amounts of phosphorus acid or n-butyl tosylate. The quenched polycarbonate on heating to high temperatures beyond 250° C. has higher resistance for discoloration. The type of quencher, mode of addition and dosage of each quencher in relation to the catalyst dosage are critical for achieving the optimum results. It was found that the best results were obtained when phosphorus acid was used at 50 times (mole terms) the levels of NaOH catalyst that was initially added in the reactor during polymerization.

The process disclosed herein can be used to prepare aliphatic polycarbonate and aliphatic-aromatic copolycarbonates having a weight average molecular weight (Mw) of about 3,000 to about 150,000 and a glass transition temperature (Tg) of about 80° C. to about 300° C. The number average molecular weights (Mn) of the aliphatic-aromatic copolycarbonate is at about 1500 to about 75000. The polycarbonate and copolycarbonate have high mechanical strength. The elastic modulus is about 2.0 GPa to about 6.0 Gpa, as determined by instrumented indentation technique. Polycarbonates and copolycarbonates prepared according to the methods described herein have been measured to have a hardnesses of about 150 MPa to about 350 Mpa (also determined by instrumented indentation technique). The transparency of cast films made from the polycarbonate or copolycarbonates prepared by the claimed method is greater than about 89%, as determined by Haze Guard Instrument. The aliphatic homopolycarbonate and aliphatic-aromatic copolycarbonate have a Fries product concentration of less than about 500 ppm as determined by HPLC. The homo and copolycarbonates disclosed herein may further exibit lower Refractive Index (RI), higher scratch resistance and lower oxygen permeability compared to conventional BPA homopolycarbonate. Furthermore the disclosed homo and copolycarbonates are also optically active.

The homo and copolycarbonates may be used in making various articles including, but not limited to a film, a sheet, an optical wave guide, a display device and a light emitting diode prism. Furthermore the polycarbonates may further be used in making articles such as, exterior body panels and parts for outdoor vehicles and devices including automobiles, protected graphics such as signs, outdoor enclosures such as telecommunication and electrical connection boxes, and construction applications such as roof sections, wall panels and glazing. Multilayer articles made of the disclosed polycarbonates particularly include articles which will be exposed to UV-light, whether natural or artificial, during their lifetimes, and most particularly outdoor articles; i.e., those intended for outdoor use. Suitable articles are exemplified by automotive, truck, military vehicle, and motorcycle exterior and interior components, including panels, quarter panels, rocker panels, trim, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, headlamps, tail lamps, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, roofs, windows, floors, decorative window furnishings or treatments; treated glass covers for pictures, paintings, posters, and like display items; wall panels, and doors; protected graphics; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; computer housings; desk-top computer housings; portable computer housings; lap-top computer housings; palm-held computer housings; monitor housings; printer housings; keyboards; FAX machine housings; copier housings; telephone housings; mobile phone housings; radio sender housings; radio receiver housings; light fixtures; lighting appliances; network interface device housings; transformer housings; air conditioner housings; cladding or seating for public transportation; cladding or seating for trains, subways, or buses; meter housings; antenna housings; cladding for satellite dishes; coaed helmets and personal protective equipment; coated synthetic or natural textiles; coated photographic film and photographic prints; coated painted articles; coated dyed articles; coated fluorescent articles; coated foam articles; and like applications.

The homopolycarbonate of aliphatic diol and the copolycarbonate of aliphatic diol and aromatic dihydroxy compound as disclosed herein may be blended with other polymers. The disclosed polycarbonates may be blended with polymers including thermoplastics and thennosets. The homopolycarbonates and copolycarbonates disclosed can be blended with other polycarbonates including, but not limited to, conventional BPA polycarbonate (BPA PC) and polycarbonates made using monomers such as resorcinol, 1,1-bis (4'-hydroxy-3'methyl phenyl)cyclohexane and 4,4'[1-methyl-4-(1-methylethyl)-1,3-cyclohexandiyl]bisphenol. The disclosed polycarbonates also may be blended, for example, with aliphatic polyesters such as polycyclohexylidene cyclohexanedicarboxylate (PCCD).

It will be appreciated by a person skilled in the art, that the method of making aliphatic homopolycarbonates and aliphatic-aromatic copolycarbonates as described above may be made in a batch or a continuous process.

In the process of preparing polycarbonates described herein, some branching reaction (Fries reaction) takes place (especially at higher temperature and exacerbated by alpha catalysts) resulting in a Fries product. Fries products are defined as structural units of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt polymerization method in which Fries reaction occurs, the Fries product comprises structure IX below, which affords 2-carboxy bisphenol A upon complete hydrolysis of the product polycarbonate. As indicated, the Fries product may serve as a site for polymer branching, the wavy lines of structure IX indicating polymer chain structure.

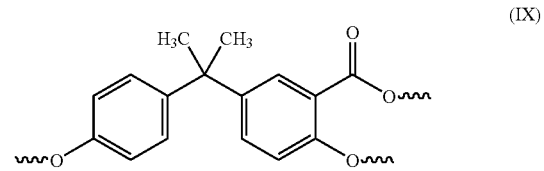

(IX)

The polycarbonates prepared in the disclosed method are analyzed for Fries content by High Performance Liquid Chromatography (HPLC) and the concentration of fries product is less than about 500 parts per million (ppm). This range of Fries concentration is much less that what is obtained in a conventional melt polymerization process. Fries products are undesirable for certain polycarbonates because excessive levels can adversely affect certain physical properties.

The aliphatic-aromatic copolycarbonates disclosed herein comprise an essentially random arrangement of subunits as indicated in spectra generated by $^{13}C$ NMR technique.

Copolycarbonates prepared by the disclosed method from isosorbide, BPA, and diphenyl carbonate, a homopolycarbonate of BPA and diphenyl carbonate and a homopolycarbonate of isosorbide and diphenyl carbonate were analyzed by $^{13}$C NMR studies.

Figure 2:
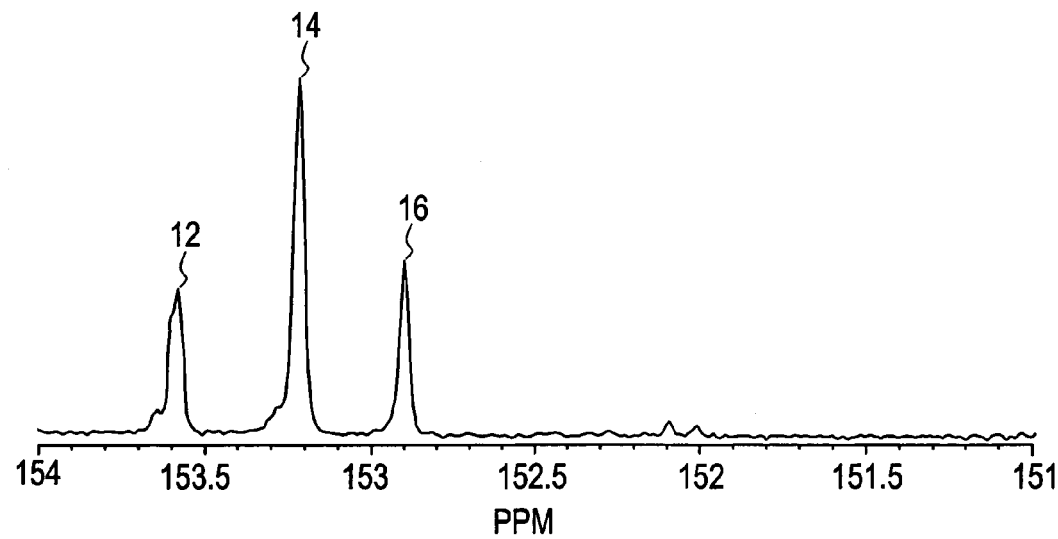
FIG. 2 depicts the carbonate region of a $^{13}C$ NMR spectrum of isosorbide homopolycarbonate made using the melt method with DPC.

The carbonate region of the homopolycarbonates of BPA is shown in FIG. 1. FIG. 1 shows a peak 10 at 151.7 ppm, which corresponds to the carbonate region of homopolycarbonate of BPA. FIG. 2 shows 3 peaks 12, 14 and 16, which represent the carbonate region of the homopolycarbonate of isosorbide.

Figure 3:
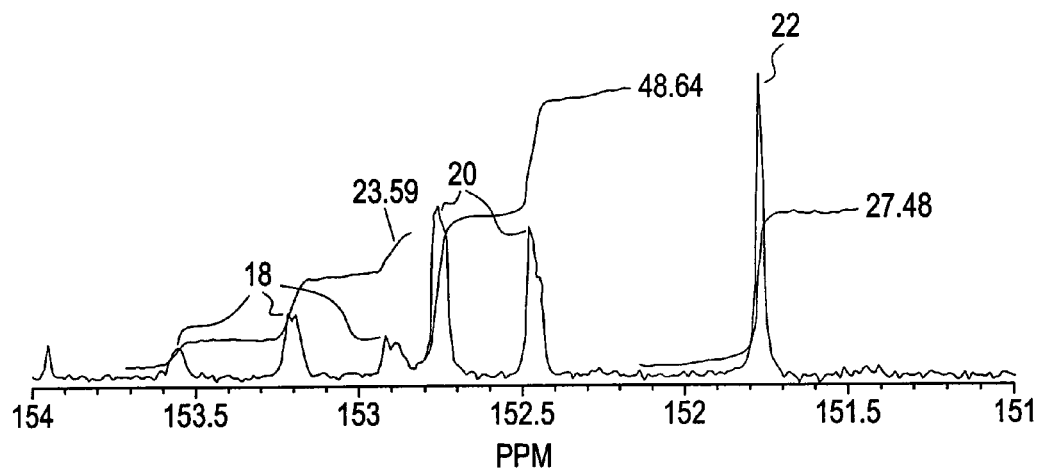
FIG. 3 depicts the carbonate region of a $^{13}C$ NMR spectrum of co-polycarbonate of isosorbide-BPA made using the melt method with DPC.
Figure 4:
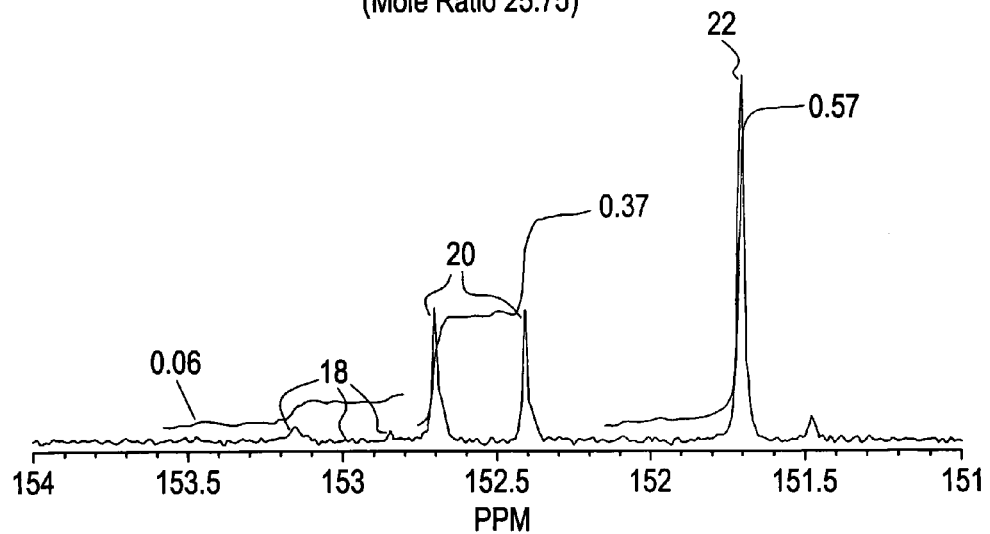
FIG. 4 depicts the carbonate region of a $^{13}C$ NMR spectrum of another co-polycarbonate of isosorbide-BPA made using the melt method with DPC.

FIGS. 3 and 4 show the carbonate region of the copolycarbonates. In a block copolymer the carbonate region would have a peak at 151.7 ppm corresponding to the BPA blocks (hereinafter B—B) and peaks at 153.25 ppm corresponding to the isosorbide blocks (hereinafter I—I). In contrast, the copolycarbonates of isosorbide and BPA have two peaks at 152.75 and 152.45 ppm in addition to the peaks at 151.7 ppm and 153.25 ppm. These additional two peaks are from carbonates that have a BPA moiety on one side and an isosorbide moiety on the other (hereinafter B-I or IB). Without being bound by any theory, it is believed that in a copolycarbonate where the mole ratio of isosorbide and BPA is 50:50, the probability of an isosorbide unit getting attached to another isosorbide unit is same as that of an isosorbide unit getting attached to a BPA unit. Similarly the probability of a BPA unit getting attached to another BPA unit is same as that of getting attached to an isosorbide unit. Due to this equal probability, the ratio of the area under the peaks of an isosorbide-isosorbide (18), an isosorbide-BPA (20) and a BPA—BPA (22) would be 1:2:1 based on the probability as described above. This is further illustrated by the calculation of expected area under each curve from the isosorbide-BPA copolycarbonate NMR spectra as shown in FIGS. 3 and 4.

A random copolymer has a structure, which can be indicated by the presence of several block sequences (B—B or I—I) and alternate sequences (B-I or I-B), that follows a statistical distribution.

In a random x:(1-x) copolycarbonate wherein x is the mole percent of BPA and 1-x the mole percentage of isosorbide, we can calculate the distribution as given in Table 1:

TABLE 1

| Structural units in the polymer chain | Expected Probability | Peak area for 50:50 copolycarbonate (FIG. 3) Expected (from formula of col 2) | Actual | Peak area for 25:75 copolycarbonate (FIG. 4) Expected (from formula of col 2) | Actual |
|---|---|---|---|---|---|
| B—B | x * x | 0.25 | 0.2748 | 0.5624 | 0.57 |
| I—I | (1 − x) * (1 − x) | 0.25 | 0.2359 | 0.0625 | 0.06 |
| B—I; I—B | 2(1 − x) * x | 0.50 | 0.4864 | 0.375 | 0.37 |

The peaks in FIG. 3 have a ratio close to 1:2:1, which shows that the copolycarbonate is random in structure. The peak areas, which are actually observed in FIG. 4 also agree with the expected values as shown above. It should be appreciated by any person skilled in this art that the area under the curve as measured by $^{13}$C NMR spectra will be associated with an error including but not limited to overlap of peaks and peak integration. The errors could also originate from the process of preparing the samples for the NMR studies as well as the process of making the sample co-polycarbonates from isosorbide and BPA. These factors may contribute to a deviation between the peak areas, which are predicted by the distribution as discussed in Table 1 and the peak areas as measured by $^{13}$C NMR. The copolycarbonates will be considered as random if the deviations between the predicted and the measured peak areas will be in the range of about ±25% from the predicted values. It should also be noted that while considering a co-polycarbonate, which has one structural unit, for example, BPA, in a very high concentration range, there will be blocks of BPA with isosorbide units randomly distributed over the polycarbonate chain. Same chain structures may be observed in a co-polycarbonate with very high concentration range of isosorbide, wherein the BPA units will be distributed randomly in the co-polycarbonate chain along with the isosorbide blocks.

Copolycarbonates according to the present invention comprise structural units indicative of the activated carbonate. These structural units may be end groups produced when activated carbonate fragments act as end capping agents or may be "kinks" introduced into the copolymer by incorporation of activated carbonate fragments.

For example, the polycarbonates using ester-substituted diaryl carbonates may further comprise very low levels of structural features, which arise from side reactions taking place during melt the polymerization reaction between ester-substituted diaryl carbonates of structure X and dihydroxy aromatic compounds of structure V. One such structural feature has structure XI.

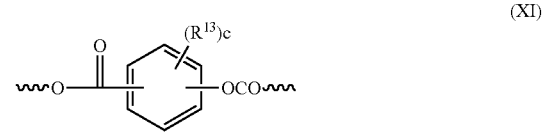

(XI)

wherein $R^{13}$ is a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical; and c is a whole number of 1–4. Typically such kinks are present only to a minor extent (e.g., 0.2 to 1 mole %).

Figure 7:
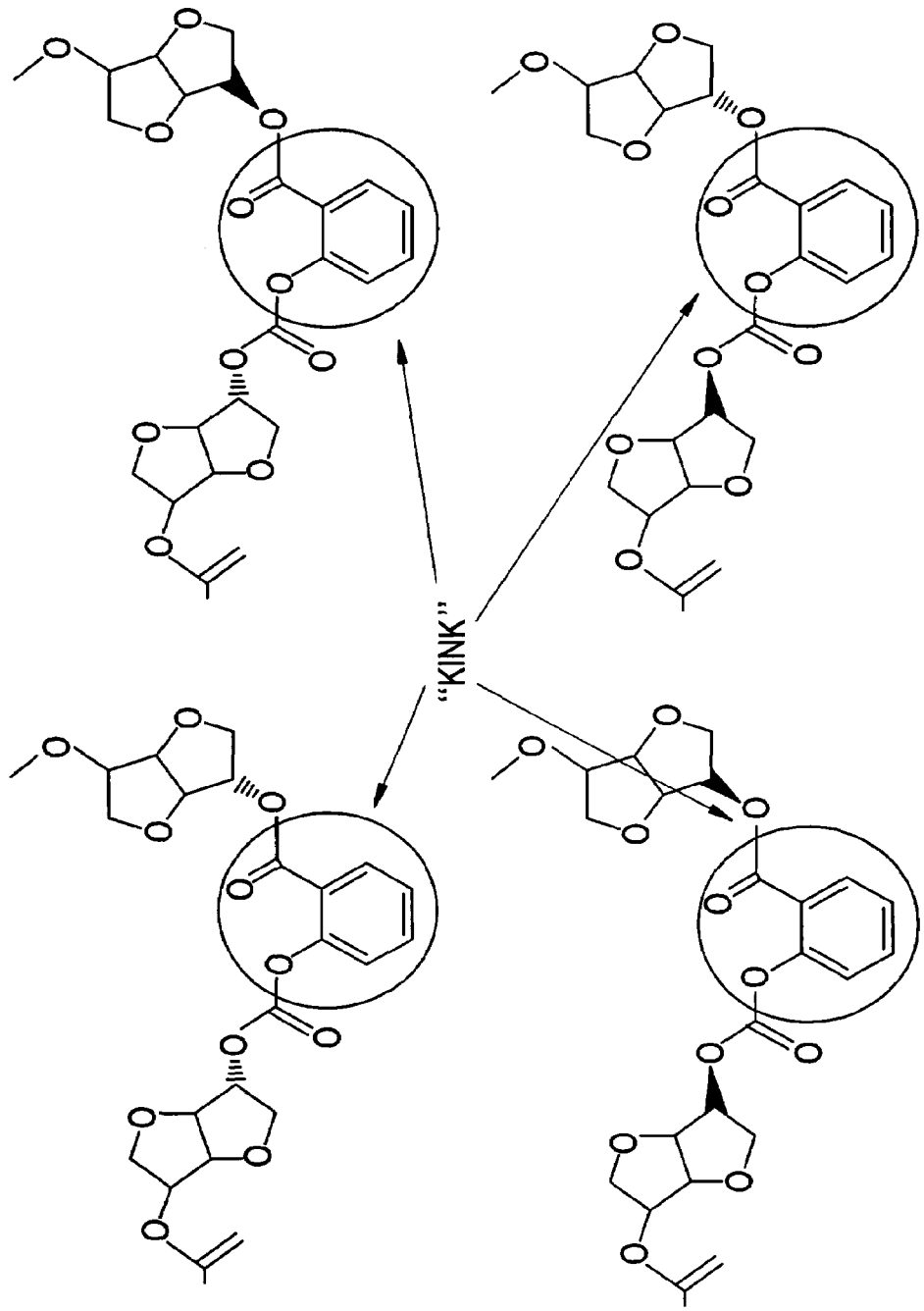
FIG. 7 depicts possible structural variations on "kinks" in an isosorbide-methylsalicylate-isosorbide copolymer that are indicative of the use of BMSC.

Structure XI is termed an internal ester-carbonate linkage or kink. Without wishing to be bound by any theory, it is thought that structure XI may arise by reaction of an ester-substituted phenol by-product, for example methyl salicylate, at its ester carbonyl group with a dihydroxy aromatic compound or a hydroxyl group of a growing polymer chain. Further reaction of the ester-substituted phenolic hydroxy group leads to formation of a carbonate linkage. Thus, the ester-substituted phenol by-product of reaction of an ester-substituted diaryl carbonate with a dihydroxy aromatic compound may be incorporated into the main chain of a linear polycarbonate. Examples of such kink structures are provided in FIG. 7.

Another structural feature present in melt polymerization reactions between ester-substituted diaryl carbonates and dihydroxy aromatic compounds is the ester-linked terminal end group having structure XII where $R^{13}$ and c are as defined above:

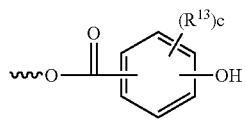

(XII)

which possesses a free hydroxyl group. Without wishing to be bound by any theory, it is believed that structure XII may arise in the same manner as structue XI but without further reaction of the ester-substituted phenolic hydroxy group. In the structures provided herein, the wavy line shown as

~~~ represents the product polycarbonate polymer chain structure. End capping of the polymer chains made by this method may be only partial. In typical embodiments of copolycarbonates prepared by the methods described herein the free hydroxyl group content is from 7% to 50%. This number may be varied by changing reaction conditions or by adding additional endcapping agents.

In one embodiment wherein the activated carbonate used is BMSC, there will be an ester linked end group of structure XIII, which possesses a free hydroxyl group. If the terminal group of structure XIII is attached to a BPA unit in the polycarbonate chain then it is designated hereinafter as BPA-salicyl-OH end and if the terminal group of structure XIII is attached to an isosorbide unit in the polycarbonate chain, it is hereinafter designated as isosorbide salicyl OH end.

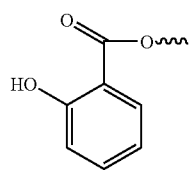

(XIII)

The polycarbonate made, using an activated aromatic carbonate as described above may also have end-groups having structure XIV:

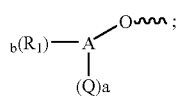

(XIV)

wherein Q is an ortho-positioned activating group. A is an aromatic ring, which can be the same or different depending on the number and location of their substituent groups, and a is a whole numbers of 1 up to a maximum equivalent to the number of replaceable hydrogen groups substituted on the aromatic rings A. $R_1$ is a substituent group selected from the group consisting of alkyl, cycloalkyl, alkoxy, aryl, alkylaryl, cyano, nitro, or halogen. The number b is a whole number of from zero up to a maximum equivalent to the number of replaceable hydrogen atons on the aromatic ring A minus the number a. Non-limiting examples of suitable ortho-positioned activating groups Q include (alkoxycarbonyl)aryl groups, halogens, nitro groups, amide groups, sulfone groups, sulfoxide groups, or imine groups with structures indicated below:

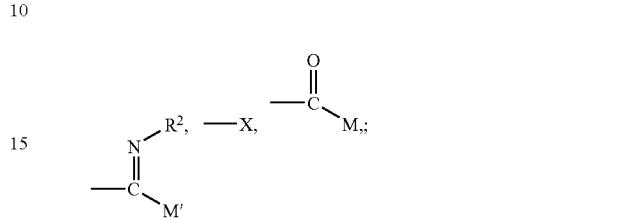

whrein X is halogen or $NO_2$; M and M' independently comprises N-dialkyl, N-alkylaryl, alkyl or aryl; and $R_2$ is alkyl or aryl.

In one embodiment the terminal end group having structure XIV is the methyl salicyl group of structure XV

(XV)

It could also include other salicyl groups such as the ethyl salicyl, isopropyl salicyl, and butyl salicyl groups.

The polycarbonates and methods of preparation disclosed here are further illustrated in of the following non-limiting examples.

EXAMPLES

Unless indicated otherwise, parts are by weight, temperature is in ° C.

Glass transition temperature (Tg) of the polycarbonates and copolycarbonates was measured by differential scanning calorimetry.

Weight average molecular weight ($M_w$) and number average molecular weight ($M_n$) were measured by gel permeation chromatography. Values quoted are relative to those measured for polystyrene standards. Polydispersity index (PDI) was calculated from the ratio $M_w/M_n$ The Fries levels were obtained by methanolysis of the polycarbonate or copolycarbonate followed by analysis of the resulting products by a high pressure liquid chromatography (HPLC). The values are expresses in parts per million (ppm).

The Yellowness index (YI) measurements were carried out on the Coloureye Macbeth instrument according to ASTM E313-73.

Transparency measurements were performed on solution cast films using a Haze guard instrument. To make a film, about 1.1 gm of polycarbonate was dissolved in about 10 ml of dichloromethane and poured into a petri dish of 7 cm diameter and was left for drying. The film was carefully removed from the dish after about 12 hours. All the films were cast on petri dishes of equal diameter to ensure uniform thickness.

Elastic modulus and hardness were measured by instrumented indentation technique. Polycarbonate samples were compression molded in form of a disk of 25 mm diameter and 3 mm to 4 mm thickness. Indentation tests were carried out by indenting with a Vickers indenter to a depth of 100 microns. The elastic modulus and hardness were measured from the load vs. indentation depth data.

Scratch resistance measurements of homo and copolycarbonate were done either with 0.2 mm thick solution cast film or with 3.2 mm molded plaques. Initially, the scratch is made on the surface of the test specimen with fixed load (2N in the case of films and 4N in the case of molded plaques). Subsequently, the scratch depth is measured (in microns) with the profilometer. A lower scratch depth is indicative of the better scratch resistance of the material. Scratch test in molded plaques was carried out in the Erichson Scratch tester type 413. The standard method on molded plaques complies with ISO 1518. Conical tipped needle with an angle of 90 Deg and a diameter of 0.1 mm was used to create the scratch. One rotation takes 12 secs and the load can vary from 0 to 10 Newton. With a profilometer the scratch depth is analysed at least in five different points.

Scratch resistance on films (200 microns thick) prepared by solvent casting was also used for scratch resistance measurement in the same instrument. Load optimization was done to get a stable crack depth profile in the profilometer.

Barrier measurement were done to evaluate the oxygen permeability for the homo and copolycarbonates. All barrier measurements were done with 30–35 micron membranes. The membranes were made by dissolving test polymer sample in chloroform, followed by the casting of above solution to get thin membranes after solvent evaporation. The thickness of the membrane can be controlled by the concentration of solution used of casting. The values are reported in Barrer (1 Barrer=10-10 cm3(STP) cm/cm2 s cmHg). Lower values indicative of an improved barrier to the oxygen gas.

RI measurements of the homo and copolycarbonates were done with LEICA ABBe Mark II refractometer. Molded plaques of the test polymer was used for the measurements. All the measurements were done at r.t. Test glass (RI=1.5168) provided along with instrument and the BPAPC (1.5864) are used as bench-mark/control samples, prior to the measurements. Typically, few drops of contact fluid (1-bromonaphthalene, RI=1.658) is placed onto the surface of the prism and spread uniformly by the placing the test specimen, covering whole portion of the prism (contact fluid is applied to avoid any air between the test specimen & prism). The bright & dark area interface is adjusted to match with cross sign, by adjusting control knob, dispersion correction wheel and eye piece.

The optical rotations were measured with a JASCO (Model P-1020) polarimeter at a wavelength of 589 (Sodium) nm in a cuvette of 50 mm length at a concentration of 5 g/L in chloroform at 250 C.

For polymer characterization, component analysis and polymer architecture studies, $^{13}C$ NMR methodology was used. All $^{13}C$ NMR spectra were recorded on a 400 MHz Fourier transform NMR spectrometer. 8000 scans were accumulated for a polymer concentration of 300 mg in 3 mL with a 30-degree flip angle pulse on carbon with inverse gated proton decoupling and a 5 sec relaxation delay between scans was used to ensure quantitative analysis of spectra. All the samples were dissolved in deuterated chloroform containing chromiumacetylacetonate (35 mg in 3 mL CDCl3) to ensure quantitative recovery of NMR signals between scans. Time domain signals were acquired and were Fourier transformed using NetNMR software with 3 Hz or 0 Hz line broadening (exponential) function depending on the need on resolution.

An effective approach to analyze and quantify functional groups in polycarbonates (e.g. end OH groups) is to derivatize the functional group with an NMR active nucleus. Derivatizing the OH end groups using $^{31}P$ is advantageous over other nuclei as it has high chemical shift sensitivity to structure and it is 100% abundant. Though 1H NMR is less time consuming it suffers a serious setback that the ppm level OH groups have to be measured along with very large signals of the polymer protons in the spectrum. This can lead to baseline problems, as the receiver gain in an NMR experiment is always set with respect to the tallest peak. Also the 1H chemical shift of an OH group is very sensitive against various external factors such as temperature, pH and solvents.

1,2-phenylene phosphochloridite of structure XVI was chosen as the $^{31}P$ derivatizing agent, because it can react readily with —OH and —COOH groups at room temperature and quantitatively converts the reactive end groups to their respective derivatives.

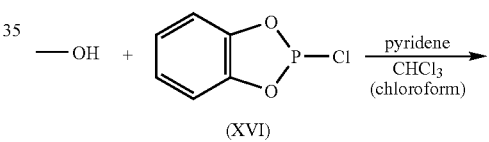

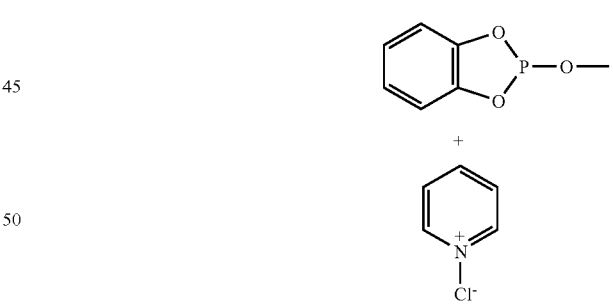

Small amount of pyridine were used to remove the HCl liberated during the derivatization process. For all the NMR measurements the polymer was dissolved in 4 mL of stock solution containing a known amount of trichlorophenol which was used here as a standard against which polymer OH groups are quantified. The stock solution was prepared by dissolving 134.1 mg of 2,4,6-trichlorophenol of structure XVII, 2.5 g of Chromium acetylacetonate and 2 mL of pyridine in CDCl3. The above solution was made to 250 mL in a volumetric flask with CDCl3. Chromium acetylacetonate is used as a relaxation agent to facilitate complete recovery of NMR signals between scans.

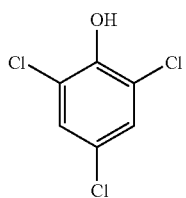

(XVII)

An accurately weighed amount of polymer was dissolved in the 4 mL of the above mentioned stock solution and about six to eight drops of 1,2-phenylenephosphochloridite (1) was added. It is always advisable to add few drops in excess so that complete derivatization is ensured. The excess phosphorelating reagent can be observed at 173 ppm as a broad signal. The derivatized polymer solution was used for $^{31}P$ NMR analysis. For NMR measurements the total spectral width was chosen to be 70 ppm with 145 ppm as the spectral center. A two second recycle delay was used between scans, with a 30 degree flip angle pulse and a total of 1600 scans were accumulated. A composite 1H decoupling sequence (WALTZ16) was employed during 31P detection. Decoupling was applied only during data acquisition and not during the recycle delay to avoid possible NOE effects in the $^{31}P$ signals.

Examples 1, 3, 5 & 7

Examples 1, 3, 5 and 7 involve preparation of homopolycarbonates and copolycarbonates using diphenyl carbonate as the carbonating agent. A glass reactor was passivated by soaking the reactor in a bath containing 1 molar aqueous hydrochloric acid solution. After 24 hours, the reactor was thoroughly rinsed with demineralized water and deionized water to ensure that all traces of acid and other contaminants were removed. The reactor was then thoroughly dried and charged with the appropriate amounts of the monomers comprising isosorbide, Bisphenol A (BPA), and diphenyl carbonate (DPC). The ratio of the number of moles of DPC to the sum of number of moles of BPA and isosorbide was kept at 1.12. In example number 1, a homopolycarbonate of isosorbide was prepared. In examples 3, 5 and 7, the mole ratio of isosorbide to BPA was 1:1, 1:3 and 1:5 respectively. After charging the reactants, the reactor was mounted in a polymerization assembly and checked to ensure that no leaks were present. The required amount of catalyst solution was then introduced into the reactor using a syringe. The catalyst was a combination of sodium hydroxide and tetramethylammonium hydroxide taken in a mole ratio of 1:100, respectively. In each case, $5.0\times10^{-4}$ moles of tetramethylammonium hydroxide per mole of total of isosorbide and BPA (Isosorbide+BPA) was used. The atmosphere inside the reactor was evacuated using a vacuum source and purged with nitrogen. This evacuation/purge cycle was repeated three times after which the contents of the reactor were heated to melt the monomer mixture. When the temperature of the mixture reached 180° C., the stirrer in the reactor was turned on and adjusted to about 40 to about 60 revolutions per minute (rpm) to ensure that the entire solid mass fully melted, a process that took about 15 minutes to 20 minutes. The reaction mixture was then heated to 210° C., while the pressure inside the reactor was adjusted to 180 millibar (18,000 Pa). After stirring the reaction for 30 minutes, the pressure inside the reactor was adjusted to 100 millibar (10,000 Pa) and stirred for 50 minutes. The reaction temperature was then raised to 240° C. while readjusting the pressure to about 15 millibar (1,500 Pa). After allowing the reaction to proceed under these conditions for about 30 minutes, the reaction temperature was raised to 260° C. while readjusting the pressure to around 1.5 millibar (150 Pa). After allowing the reaction to proceed under these conditions for about 60 minutes the pressure inside the reactor was brought to atmospheric pressure and the product was removed. The properties of the homopolycarbonate and copolycarbonates are given in Table 2.

Table 2 also contains the properties measured for BPA polycarbonate (BPA PC) made by melt polymerization method. The homopolycarbonate of isosorbide had a Tg of 151° C., which is comparable to BPA PC. The elastic modulus and hardness of the homopolycarbonate and copolycarbonates prepared in examples 1, 3 & 5 were greater than BPA PC. Fries content of homopolycarbonate of isosorbide prepared in Example 1 was below the detection limit of the HPLC. In Examples 3 and 5 the Fries contents of the aliphatic-aromatic copolycarbonate were much lower than Fries content of the BPA polycarbonate.

Example 3, with a 1:1 mole ratio of isosorbide to BPA provided the sample for the $C_{13}$ NMR spectra shown in FIG. 3. Example 5 with a mole ration of 1:3 of isosorbide to BPA provided the sample for $C_{13}$ NMR spectra shown in FIG. 4.

Examples 2, 4 & 6

Examples 2, 4 and 6 involved preparation of homopolycarbonate and copolycarbonates using bismethylsalicyl carbonate as the carbonating agent. A glass reactor was passivated by soaking the reactor in a bath containing 1 molar aqueous hydrochloric acid solution. After 24 hours, the reactor was thoroughly rinsed with demineralized water and deionized water to ensure that all traces of acid and other contaminants were removed. The reactor was then thoroughly dried and charged with the appropriate amounts isosorbide, Bisphenol A (BPA), and bismethylsalicyl carbonate (BMSC). The ratio of the number of moles of BMSC to the sum of the number of moles of BPA and isosorbide was kept 1.03. The reactor was mounted in a polymerization assembly and checked to ensure that no leaks were present. The required amount of catalyst solution, prepared as described in Examples 1, 3, and 5, was introduced into the reactor using a syringe. The catalyst was a combination of sodium hydroxide and tetrabutylphosphonium acetate in a mole ratio of 1:100, respectively. In each case, $1.5\times10^{-4}$ moles of tetrabutylphosphonium acetate per mole of diol and dihydroxy compound (isosorbide +BPA) was used. The atmosphere inside the reactor was evacuated using a vacuum source and purged with nitrogen. The evacuation/purge cycle was repeated three times after which the contents of the reactor were heated to melt the monomer mixture. When the temperature of the mixture reached 180° C., the stirrer in the reactor was turned on and adjusted to about 40 to about 60 revolutions per minute (rpm) to ensure that the entire solid mass fully maintained, a process that took about 20 minutes. Next, the reaction mixture was heated to 220° C. at atmospheric pressure. After stirring the reaction mass for 15 minutes, the temperature was increased to 250° C., while the pressure inside the reactor was adjusted to 100 millibar (10,000 Pa). After stirring the reaction mass at this condition for 15 minutes, the. reaction temperature was raised to 260° C. while readjusting the pressure to around 1.5 millibar (150 Pa). After allowing the reaction to proceed under these conditions for about 5 minutes, the pressure inside the reactor was brought to atmospheric pressure and the product was removed. In the cases where the product was of high molecular weight, the molten polymer was dropped down by pressurizing the reactor with nitrogen gas. Results are shown in Table 2.

Examples 8, 9, & 10

In Examples 8, 9 & 10, the procedure was same as that in examples 1, 3, 5 & 7. In example 8, the copolycarbonate was prepared using isosorbide and 1,3 BHPM at a mole ratio of 1:1. In example 9, the copolycarbonate was prepared using isosorbide and resorcinol at a mole ratio of 1:1. In example 10, the copolycarbonate was prepared using isosorbide and DMBPC at a mole ratio of 1:1. Results are shown in Table 2.

The properties of homo and copolycarbonates prepared in examples 2, 4 and 6 were comparable or better than conventional BPA PC. Example 2, a homopolycarbonate of isosorbide showed a Tg comparable to that of BPA PC. The elastic modulus and hardness of polycarbonates prepared in examples 2, 4 & 6 were far more than conventional BPA polycarbonate. Fries contents of homo polycarbonate of isosorbide prepared in example 2 and isosorbide-BPA copolycarbonate as prepared in examples 4 & 6 were below the detection limit of the technique used in HPLC. The yellowness index and the transparency values of the polycarbonates prepared in examples 2, 4 & 6 were also better than conventional BPA polycarbonate.

The copolycarbonate of isosorbide and 1,3 BHPM as shown in example 8, showed a Tg of 192° C., which is far greater that the conventional BPAPC.

Example 12

Figure 6:
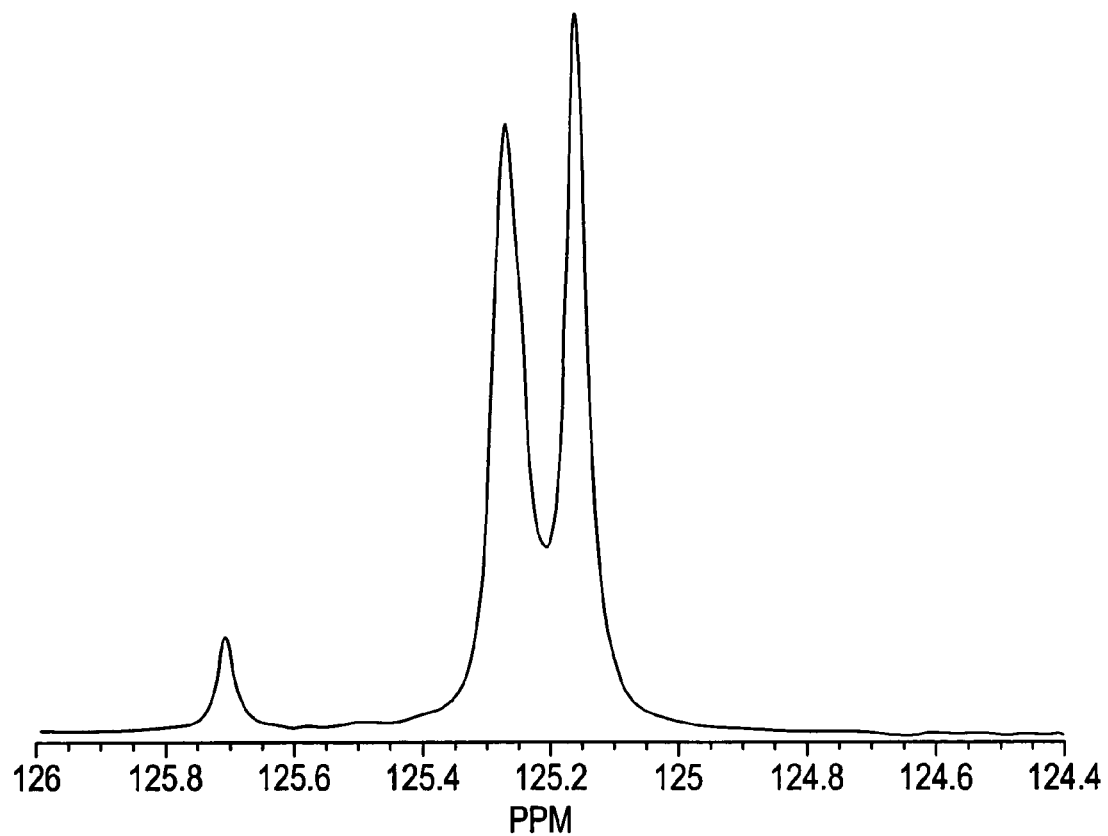
FIG. 6 depicts the $^{31}P$ NMR spectrum of another co-polycarbonate of isosorbide-BPA.

In example 12, the copolycarbonate prepared in Example 3, with a 1:1 mole ratio of isosorbide to BPA using DPC as carbonating agent provided the sample for the $^{31}$P NMR spectra shown in FIG. 6. Peaks 24 and 26 were not observed in this NMR spectrum.

Example 13

Figure 8:
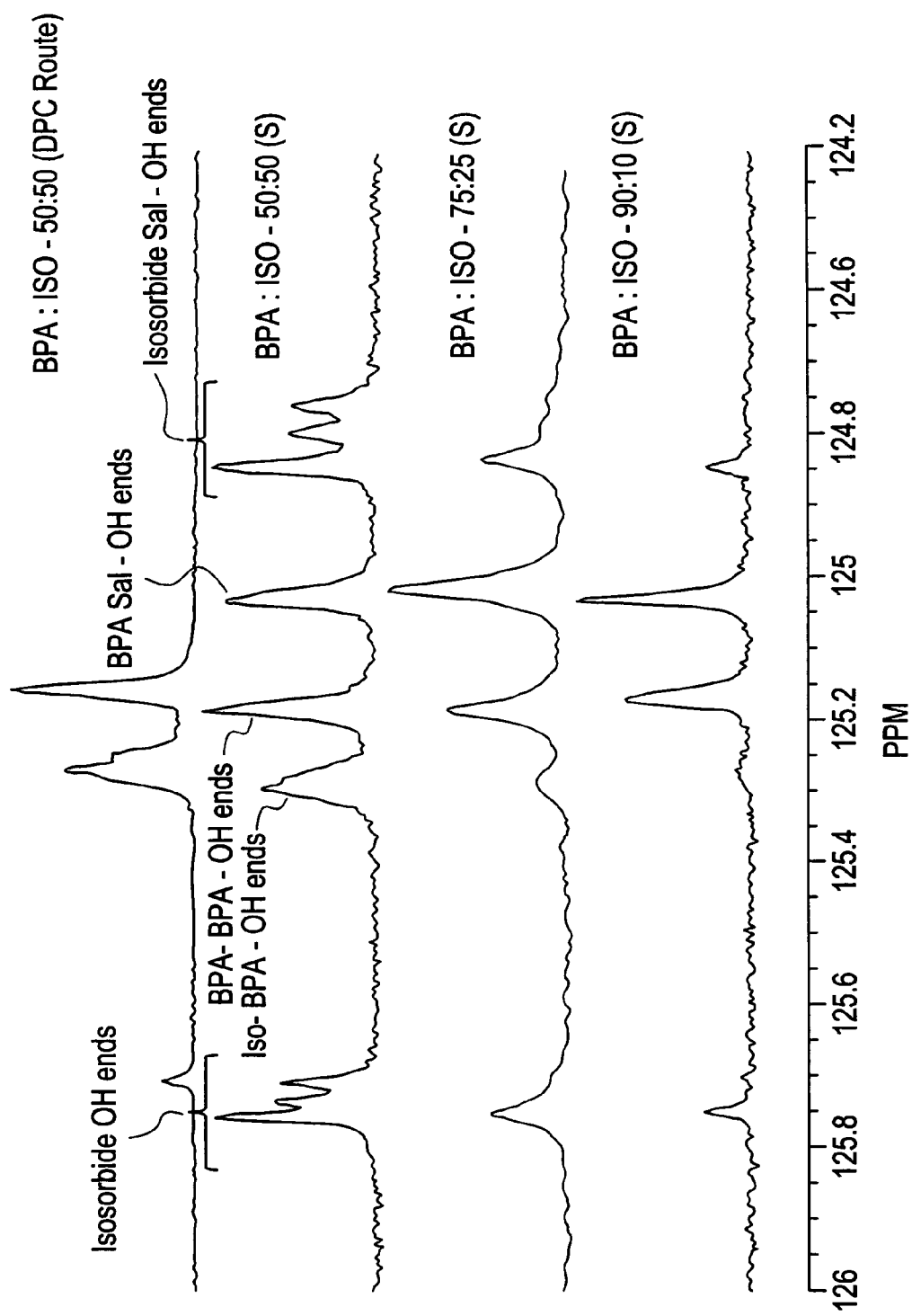
FIG. 8 depicts the $^{31}P$ NMR spectra of co-polycarbonates of isosorbide-BPA made using DPC versus using BMSC.

Various isosorbide:BPA copolymers were prepared by the activated carbonate (BMSC) and melt (DPC) methods. $^{31}$P NMR spectra were collected for comparison purposes as shown in FIG. 8.

Examples 14–19

The homo and copolycarbonates prepared in examples 14–19 as indicated in Table 3 are prepared in the same procedure as described in examples 2, 4 and 6 in the preceding sections. Homo and copolycarbonates of examples 14–19 were measured for oxygen permeability and the data as shown in the table 3 clearly shows and the oxygen permeability is maximum for BPA PC and gets reduced with increasing amount of isosorbide in the copolycarbonate.

The homo and copolycarbonates of examples 14, 18 and 19 were tested for scratch resistance and the scratch depth of copolycarbonates of isosorbide and BPA made in examples 18 and 19 showed much better scratch resistance compared to BPA PC as in example 14.

TABLE 2

| Composition | Example Number | Carbonating Agent | Mw (PS) | Mn (PS) | Tg (° C.) | Elastic Modulus (Gpa) | Hardness (Mpa) | Fries (ppm) | YI | Transparency (%) |
|---|---|---|---|---|---|---|---|---|---|---|
| BPA PC | | DPC | 33495 | 17241 | 148.0 | 2.94 | 191.0 | 731.9 | 0.77 | 90.9 |
| Isosorbide (100%) | 1 | DPC | 16060 | 8728 | 151.0 | 4.95 | 311.8 | Not detected | 10.54 | |
| | 2 | BMSC | 20678 | 10147 | 152.0 | 4.83 | 313.8 | Not detected | 0.44 | |
| Isosorbide-BPA (50—50) | 3 | DPC | 27879 | 15832 | 152.0 | 3.34 | 234.3 | 158.4 | 4.53 | |
| | 4 | BMSC | 28991 | 15955 | 152.5 | 3.29 | 232.7 | Not detected | 0.343 | 92.0 |
| Isosorbide-BPA (25–75) | 5 | DPC | 38795 | 21597 | 152.0 | 3.63 | 222.7 | 42.8 | 9.74 | |
| | 6 | BMSC | 33588 | 17696 | 151.0 | 3.45 | 219.8 | Not detected | 0.62 | 91.9 |
| Isosorbide - BPA (83–17) | 7 | DPC | 25767 | 15358 | N/A | N/A | N/A | N/A | N/A | N/A |
| Isosorbide-1,3 BHPM (50—50) | 8 | DPC | 24378 | 11891 | 192.0 | N/A | N/A | N/A | N/A | N/A |
| Isosorbide - resorcinol (50—50) | 9 | DPC | 10217 | 6125 | 111.0 | N/A | N/A | N/A | N/A | N/A |
| Isosorbide - DMBPC | 10 | DPC | 23230 | 12360 | 155.0 | N/A | N/A | N/A | N/A | N/A |

Examples 11

Figure 5:
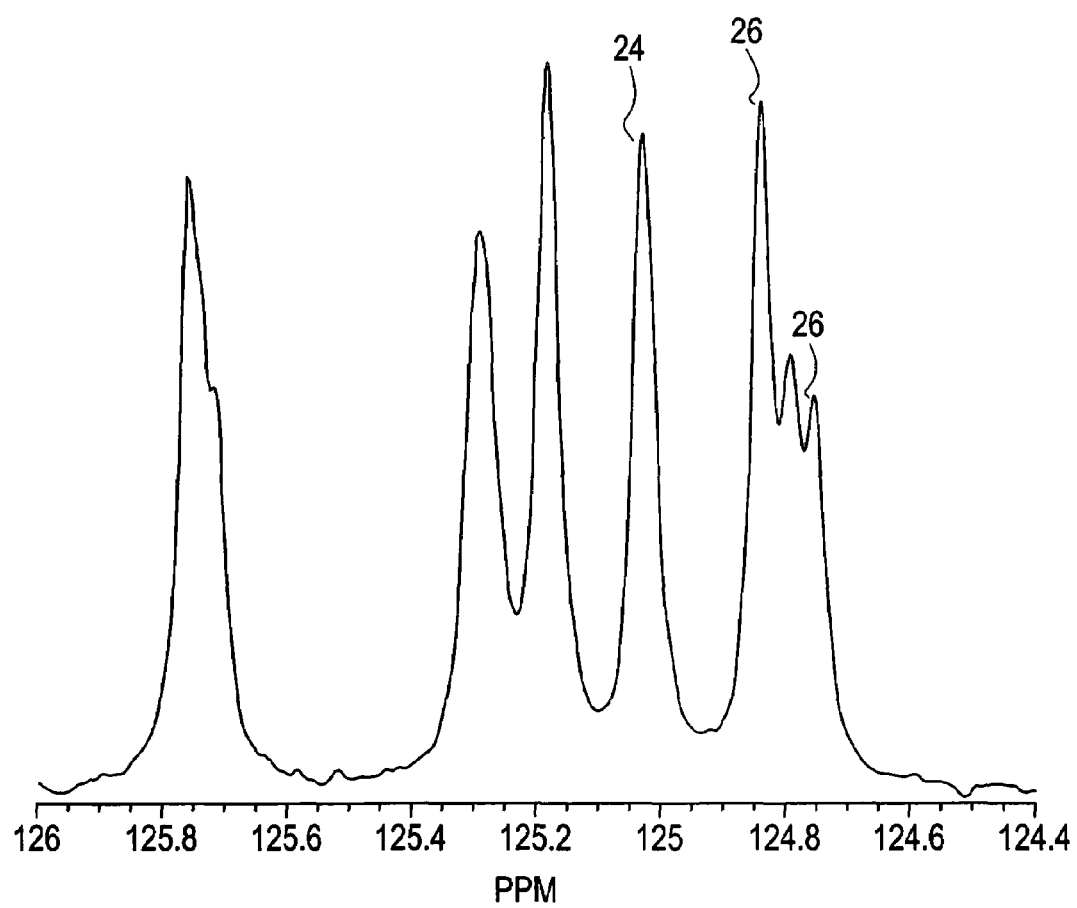
FIG. 5 depicts the $^{31}P$ NMR spectrum of a co-polycarbonate of isosorbide-BPA.

In example 11, the copolycarbonate prepared in Example 4, with a 1:1 mole ratio of isosorbide to BPA using BMSC as carbonating agent provided the sample for the $^{31}$P NMR spectra shown in FIG. 5. Peaks 24 represent BPA-salicyl OH end and peaks 26 represent isosorbide salicyl OH ends. The presence of these peaks corresponding to structure XIII are observed only when BMSC was used as a carbonating agent for the polymerization process.

The Refractive Index(RI) for the homopolymers made from BPA as in example 14 is higher than the RI of the homopolymers made from isosorbide as shown in example 15.

The homo and copolycarbonates disclosed herein as made in examples 15–19 are optically active as shown in Table 3. The optical rotation of copolycarbonates comprising 25% isosorbide has an optical rotation of 45° and increases up to 155° in case of homopolycarbonate of isosorbide. This property of the disclosed polycarbonates make them suitable candidates for making optical wave guides.

TABLE 3

| Composition | Example Number | Carbonating Agent | O2 permeability (Barrier) | Scratch Depth Microns) | Optical Rotation | Refractive Index |
|---|---|---|---|---|---|---|
| BPA PC | 14 | BMSC | 0.98 | 8 | 0 | 1.58 |
| Isosorbide (100%) | 15 | BMSC | | | 155 | 1.5 |
| Isosorbide-BPA (25–75) | 16 | BMSC | 0.75 | | 45 | |
| Isosorbide-BPA (50—50) | 17 | BMSC | 0.3 | | 85 | |
| Isosorbide-BPA (75–25) | 18 | BMSC | 0.2 | 6.5 | 115 | |
| Isosorbide-BPA (90–10) | 19 | BMSC | 0.1 | 4.75 | 140 | |

Example 20–21

Examples 20 involved preparation of copolycarbonate using bismethylsalicyl carbonate as the carbonating agent and quenching the polycarbonate with a quencher as described herein. 25 g of polycarbonate [having 10 mole % isosorbide and 90 mole % BPA] was dissolved in about 100 ml of dichloromethane solvent in a conical flask. The flask was shaken to ensure the polycarbonate was completely dissolved. In a separate beaker, about 500 ml of methanol was taken. The moles of NaOH added as catalyst in making these polycarbonates usually varies between 1 to $2 \times 10^{-6}$ moles for every mole of the bisphenol or diol (or both together depending on whether a copolycarbonate or a homopolycarbonate was being made). A loading of close to 50 times in moles of phosphorus acid was added. A stock solution of phosphorus acid was made by dissolving 2.16 g in 20 ml of Milli-Q water. From the stock solution, 100 ml was taken in a syringe and added to the methanol. The polycarbonate was precipitated out of the solution in dichloromethane by adding it slowly into the methanol containing the phosphorus acid quencher. The methanol was continuously stirred to ensure proper mixing. The precipitated polycarbonate was then filtered and the residual methanol was removed by drying under vacuum overnight. 5 g of the dried polycarbonate was then taken in a test tube or a vial and subjected to a temperature of 250° C. for 10 minutes in either an oil heated or electrically heated chamber. The color change after 10 minutes was visually rated on a scale of 1 to 10 where 10 was brown and 1 denoted colorless polycarbonate. The polycarbonate remained colorless after the exposure to a temperature of 250° C.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition comprising a copolycarbonate, which copolycarbonate comprises: structural units derived from an aliphatic diol of the formula I:

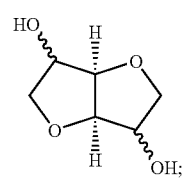
(I)

structural units derived from an aromatic dihydroxy compound of the formula II:

HO-A-OH  (II);

and C=O structural units derived from an activated diaryl carbonate of the formula III:

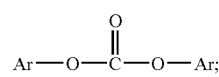
(III)

wherein A is an aromatic radical; Ar is a substituted aromatic radical having 6 to 30 carbon atoms; said copolycarbonate comprises random arrangement of said structural units derived from the aliphatic diol and the aromatic hydroxy compounds; and said copolycarbonate further comprises structural units indicative of the activated carbonate.

2. The copolycarbonate of claim 1, wherein the copolycarbonate is not liquid crystalline and has a number average molecular weight greater than 7,500.

3. The composition according to claim 2, wherein the aromatic dihydroxy compound comprises at least one compound of the formula IV:

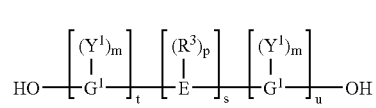
IV wherein each $G^1$ is independently an aromatic group; E is selected from the group consisting of an alkylene group, an alkylidene, a cycloaliphatic group, a sulfur-containing linkage group, a phosphorus-containing linkage group, an ether linkage group, a carbonyl group, a tertiary nitrogen group, and a silicon-containing linkage group; $R^3$ is a hydrogen or a monovalent hydrocarbon group; each $Y^1$ is independently selected from the group consisting of a monovalent hydrocarbon group, an alkenyl group, an allyl group, a halogen, an oxy group and a nitro group; each m is independently a whole number from zero through the number of positions on each respective $G^1$ available for substitution; p is a whole number from zero through the number of positions on E available for substitution; t is a natural number; s is either zero or one; and u is a whole number.

4. The composition according to claim 3, wherein the aromatic dihydroxy compound is selected from the group consisting of 4,4'-(3,3,5-trimethylcyclohexylidene)diphenol, 4,4'-bis(3,5-dimethyl)diphenol, 1,1-bis(4-hydroxy-3-methylphenyl)cyclohexane, 1,1-bis(4'-hydroxy-3'methylphenyl)cyclohexane (DMBPC), 4,4'-[1-methyl-4-(1-methyl-ethyl)-1,3-cyclohexandiyl]bisphenol (1,3 BHPM), 4-[1-[3-(4-hydroxyphenyl)-4-methylcyclohexyl]-1-methylethyl]-phenol (2,8 BHPM), 3,8-dihydroxy-5a,10b-diphenyl-coumarano-2',3',2,3-coumarane (DCBP), 2-phenyl-3,3-bis(4-hydroxyphenyl)phthalimidine (PPPBP), 4,4-bis(4-hydroxyphenyl)heptane, 2,4'-dihydroxydiphenylmethane, bis(2-hydroxyphenyl)metane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane (BPA), 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4-hydroxiphenyl)-1-phenylpropane, 2,4-dihydroxyphenyl sulfone, 4,4'-dihydroxydiphenylsulfone (BPS), BPF, 4,4'dihydroxy-1,1-biphenyl, 2,6-dihydroxy naphthalene; hydroquinone; resorcinol, $C_{1-3}$ alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi[1H-indene]-6,6'-diol.

5. The composition according to claim 2, wherein the aliphatic diol is 1,4:3,6-dianhydro-D-glucitol.

6. The composition according to claim 3, wherein the aliphatic diol is 1,4:3,6-dianhydro-D-glucitol.

7. The composition according to claim 2, wherein the activated diaryl carbonate is bismethylsalicylcarbonate.

8. The composition according to claim 3, wherein the activated diaryl carbonate is bismethylsalicyl carbonate.

9. The composition according to claim 1, wherein the composition further comprises an additional polymer.

10. The composition according to claim 9, wherein the additional polymer is a polycarbonate or a polyester.

11. The composition according to claim 1, wherein the copolycarbonate has a concentration of structural units derived from the aromatic dihydroxy compound of 1 to 99 mole percent.

12. The composition according to claim 11, wherein the copolycarbonate has a concentration of structural units derived from the aliphatic diol of 1 to 99 mole percent.

13. The composition according to claim 12, wherein the copolycarbonate has a concentration of structural units derived from the aliphatic diol of at least 5 mole percent.

14. The composition according to claim 2, wherein the activated aromatic carbonate has the formula V:

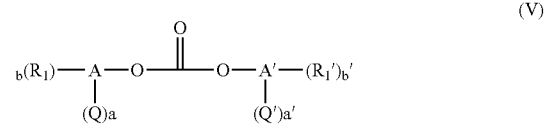

wherein A and A' are each independently aromatic rings, a and a' are whole numbers of zero up to a maximum equivalent to the number of replaceable hydrogen groups substituted on the aromatic rings A and A' respectively, wherein a+a' is greater than or equal to 1; $R_1$ and $R_1'$ are each independently substituent groups selected from the group consisting of alkyl, cycloalkyl, alkoxy, aryl, cyano, nitro, and halogen; b is a whole number of from 0 up to a maximum equivalent to the number of replaceable hydrogen groups on the aromatic ring A minus a; b' is a whole number of from 0 up to a maximum equivalent to the number of replaceable hydrogen groups on the aromatic ring A' minus a'; and wherein Q and Q' are each independently an ortho positioned activating group selected from the group of radicals consisting of (alkoxycarbonyl)aryl groups, halogens, nitro groups, amide groups, sulfone groups, sulfoxide groups, or imine groups with structures indicated below:

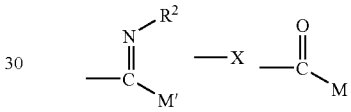

wherein, X comprises halogen or $NO_2$, M and M' independently comprises N-alkyl, N-aryl, or N-allyl aryl and R2 comprises alkyl or aryl.

15. The composition according to claim 14, wherein the activated aromatic carbonate is an ester-substituted diaryl carbonate of formula X:

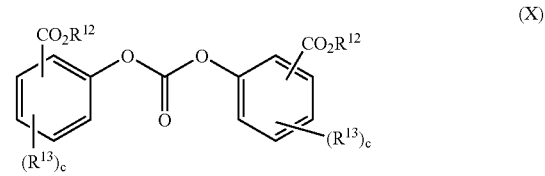

wherein $R^{12}$ is independently at each occurrence selected from the group consisting of an $C_1$–$C_{20}$ alkyl radical, a $C_4$–$C_{20}$ cycloalkyl radical, and a $C_4$–$C_{20}$ aromatic radical; $R^{43}$ is independently at each occurrence selected from the group consisting of a halogen, a cyano group, a nitro group, a $C_1$–$C_{20}$ alkyl radical, a $C_4$–$C_{20}$ cycloalkyl radical, a $C_4$–$C_{20}$ aromatic radical, a $C_1$–$C_{20}$ alkoxy radical, a $C_4$–$C_{20}$ cycloalkoxy radical, a $C_4$–$C_{20}$ aryloxy radical, a $C_1$–$C_{20}$ alkylthio radical a $C_4$–$C_{20}$ cycloalkylthio radical, a $C_4$–$C_{20}$ arylthio radical, a $C_1$–$C_{20}$ alkylsulfinyl radical, a $C_4$–$C_{20}$ cycloalkylsulfinyl radical, a $C_4$–$C_{20}$ arylsulfinyl radical, a $C_1$–$C_{20}$ alkylsulfonyl radical, a $C_4$–$C_{20}$ cycloalkylsulfonyl radical, a $C_4$–$C_{20}$ arylsulfonyl radical, a $C_1$–$C_{20}$ alkoxycarbonyl radical, a $C_4$–$C_{20}$ cycloalkoxycarbonyl radical, a $C_4$–$C_{20}$ aryloxycarbonyl radical, a $C_2$–$C_{60}$ alkyamino radical, a $C_6$–$C_{60}$ cycloalkylamino radical, a $C_5$–$C_{60}$ arylamino radical, a $C_1$–$C_{40}$ alkylaminocarbonyl radical, a $C_4$–$C_{40}$ cycloalkylaminocarbonyl radical, a $C_4$–$C_{40}$ arylaminocarbonyl radical, and a $C_1$–$C_{20}$ acylamino radical; and c is independently at each occurrence a whole number of from 0 to 4.

16. The composition according to claim 15, wherein the activated aromatic carbonate is bismethylsalicyl carbonate.

17. The composition according to claim 1, wherein the structural units indicative of the activated carbonate are end groups.

18. The composition according to claim 17, wherein the end groups indicative of the activated carbonate have the structure XIV:

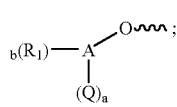
(XIV)

wherein Q is an ortho-positioned activating group; A is an aromatic ring, a is a natural numbers of 1 to the number of replaceable hydrogen groups substituted on the aromatic ring A; $R_1$ is a substituent group selected from the group consisting of alkyl, cycloalkyl, alkoxy, aryl, cyano, nitro, and halogen; b is a whole number of from 0 to the number of replaceable hydrogen groups on the aromatic ring minus a; and Q is a radical independently selected from the group consisting of (alkoxycarbonyl)aryl groups, halogens, nitro groups, amide groups, sulfone groups, sulfoxide groups, or imine groups with structures indicated below:

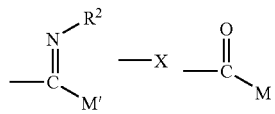

wherein, X comprises halogen or $NO_2$, M and M' independently comprises N-alkyl, N-aryl, or N-alkyl aryl and R2 comprises alkyl or aryl.

19. The composition according to claim 18, wherein the end groups indicative of the activated carbonate are comprise methyl salicyl groups of formula XV:

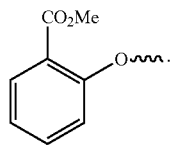
(XV)

20. The composition according to claim 17, wherein the end groups indicative of the activated carbonate comprise end groups of structure XII:

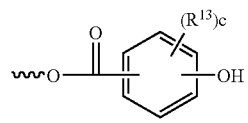
(XII)

wherein $R^{13}$ is a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical; and c is a whole number of 1–4.

21. The composition according to claim 20, wherein the end groups indicative of the activated carbonate comprise end groups of structure XII:

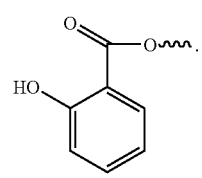
(XIII)

22. The composition according to claim 1, wherein the structural units indicative of the activated carbonate are internal ester-carbonate linkages of formula XI:

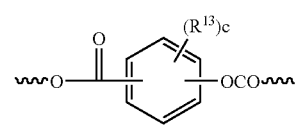
(XI)

wherein $R^{13}$ is a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkcoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, or $C_1$–$C_{20}$ acylamino radical; and c is a whole number of 1–4.

23. The composition according to claim 5, wherein the copolycarbonate has a yellowness index of less than 2.

24. The composition according to claim 20, wherein the copolycarbonate has a yellowness index of less than 1.

25. The composition according to claim 24, wherein the copolycarbonate has a yellowness index of less than 0.8.

26. The composition according to claim 5, wherein the copolycarbonate has less than 25 ppm Fries product.

27. The composition according to claim 5, wherein the copolymer has a yellowness index of less than 1, a Tg of at least 140° C. and a transparency of at least 80%.

28. An article comprising the composition of claim 1.

29. The article of claim 28 comprising a film, a sheet, an optical wave guide, a display device and a light emitting diode prism.

30. A composition comprising a copolycarbonate, wherein the copolycarbonate comprises:

structural units derived from: 1,4:3,6-dianhydro-D-glucitol;

structural units derived from an activated aromatic dihydroxy compound of the formula II:

HO-A-OH          (II);

and C=O structural units derived from a activated diaryl carbonate of the formula III:

wherein A is an aromatic radical; Ar is a substituted aromatic radical having 6 to 30 carbon atoms; said copolycarbonate comprises random arrangement of said structural units derived from the aliphatic diol and the aromatic hydroxy compounds, is not liquid crystalline, has a number average molecular weight greater than 7,500, has a Tg of at least 140° C. and has a yellowness index of less than 1.

31. A composition comprising a copolycarbonate, which copolycarbonate consists essentially of structural units derived from one or more aliphatic diols of the formula I:

structural units derived from one or more aromatic dihydroxy compounds of the formula II:

HO-A-OH          (II);

and C=O structural units derived from one or more activated diaryl carbonate of the formula III:

wherein A is an aromatic radical; Ar is a substituted aromatic radical having 6 to 30 carbon atoms; said copolycarbonate comprises random arrangement of said structural units derived from the aliphatic diol and the aromatic hydroxy compounds; and the copolycarbonate further comprises structural units indicative of the activated carbonate.

32. A method comprising reacting together, in the presence of a catalyst, one or more aliphatic diol of the formula I:

one or more aromatic dihydroxy compounds of the formula II:

HO-A-OH          (II);

and one or more activated diaryl carbonate of the formula III:

wherein A is an aromatic radical and Ar is a substituted aromatic radical having from 6 to 30 carbon atoms.

33. The method according to claim 32, wherein the aliphatic diol is 1,4:3,6-dianhydro-D-glucitol.

34. The method according to claim 32, wherein the aromatic dihydroxy compound comprises at least one compound of the formula IV

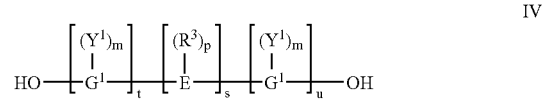

wherein each $G^1$ is an independently aromatic group; E is selected from the group consisting of an alkylene group, an alkylidene group, a cycloaliphatic group, a sulfur-containing linkage group, a phosphorus-containing linkage group, an ether linkage group, a carbonyl group, atertiary nitrogen group, and a silicon-containing linkage group; $R^3$ is a hydrogen or a monovalent hydrocarbon group each; $Y^1$ is independently selected from the groups consisting of a monovalent hydrocarbon group, an alkenyl group, an allyl group, a halogen, an oxy group and a nitro group; each m is independently a whole number from zero through the number of positions on each respective $G^1$ available for substitution; p is a whole number from zero through the number of positions on E available for substitution; t is a natural number greater than or equal to one; s is either zero or one; and u is a whole number.

35. The method according to claim 32, wherein the dihydroxy compound is selected from the group consisting of 4,4'-(3,3,5-trimethylcyclohexylidene)diphenol, 4,4'-bis(3,5-dimethyl)diphenol, 1,1-bis(4-hydroxy-3-methylphenyl)cyclohexane, 1,1-bis(4'-hydroxy-3'methylphenyl)cyclohexane (DMBPC), 4,4'-[1-methyl-4-(1-methyl-ethyl)-1,3-cyclohexandiyl]bisphenol (1,3 BHPM), 4-[1-[3-(4-hydroxyphenyl)-4-methylcyclohexyl]-1-methyl-ethyl]-phenol (2,8 BHPM), 3,8-dihydroxy-5a,10b-diphenylcoumarano-2',3',2,3-coumarane (DCBP), 2-phenyl-3,3-bis(4-hydroxyphenyl)phthalimidine (PPPBP) 4,4-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane (BPA), 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 4,4'-dihydroxydiphenylsulfone (BPS), BPF, 4,4'dihydroxy-1,1-biphenyl, 2,6-dihydroxy naphthalene; hydroquinone; resorcinol, $C_{1-3}$ alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi[1H-indene]-6,6'-diol.

36. The method according to claim 32, wherein the catalyst comprises:
    a. an alpha catalyst selected from the group consisting of alkali metal salts and alkaline earth metal salt; and
    b. a beta catalyst selected from the group consisting of a quaternary ammonium compound and a quaternary phosphonium compound.

37. The method according to claim 32, wherein the activated aromatic carbonate has formula V:

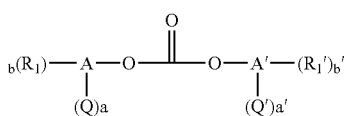

(V)

wherein A and A' are each independently aromatic rings, a and a' are whole numbers of zero up to a maximum equivalent to the number of replaceable hydrogen groups substituted on the aromatic rings A and A' respectively, wherein a+a' is greater than or equal to 1; $R_1$ and $R_1'$ are each independently substituent groups selected from the group consisting of alkyl, cycloalkyl, alkoxy, aryl, cyano, nitro, and halogen; b is a whole number of from 0 up to a maximum equivalent to the number of replaceable hydrogen groups on the aromatic ring A minus a; b' is a whole number of from 0 up to a maximum equivalent to the number of replaceable hydrogen groups on the aromatic ring A' minus a'; and wherein Q and Q' are each independently activating groups selected from the group of radicals consisting of (alkoxycarbonyl)aryl groups, halogens, nitro groups, amide groups, sulfone groups, sulfoxide groups, or imine groups with structures indicated below:

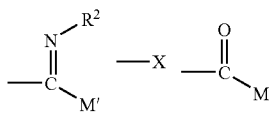

wherein, X comprises halogen or $NO_2$, M and M' independently comprises N-alkyl, N-aryl, or N-alkyl aryl and R2 comprises alkyl or aryl.

38. The method according to claim 37, wherein the activated aromatic carbonate is bismethylsalicyl carbonate.

39. The method according to claim 37, wherein the mole ratio of the activated diaryl carbonate is from 0.95 to 1.3 relative to the total moles of the aromatic dihydroxy compound and the aliphatic diol.

40. A method comprising reacting together in the presence of a catalyst:
    1,4:3,6-dianhydro-D-glucitol;
    one or more aromatic dihydroxy compounds selected from the group consisting of 4,4'-(3,3,5-trimethylcyclohexylidene)diphenol, 4,4'-bis(3,5-dimethyl)diphenol, 1,1-(4-hydroxy-3-methylphenyl) cyclohexane, 1,1-bis(4'-hydroxy-3'methylphenyl)cyclohexane (DMBPC), 4,4'-[1-methyl-4-(1-methyl-ethyl)-1,3-cyclohexandiyl]bisphenol (1,3 BHPM), 4-[1-[3-(4-hydroxyphenyl)-4-methylcyclohexyl]-1-methyl-ethyl]-phenol (2,8 BHPM), 3,8-dihydroxy-5a, 10b-diphenylcoumarano-2',3',2,3-coumarane (DCBP), 2-phenyl-3,3-bis(4-hydroxyphenyl)phthalimidine (PPPBP) 4,4-bis(4-hydroxyphenyl)heptane, 2,4'-dihydroxydiphenylmethane, bis(2-hydroxyphenyl)methane, bis(4-hydroxyphenyl)methane, bis(4-hydroxy-5-nitrophenyl)methane, bis(4-hydroxy-2,6-dimethyl-3-methoxyphenyl)methane, 1,1-bis(4-hydroxyphenyl)ethane, 1,1-bis(4-hydroxy-2-chlorophenyl)ethane, 2,2-bis(4-hydroxyphenyl)propane (BPA), 2,2-bis(3-phenyl-4-hydroxyphenyl)propane, 2,2-bis(4-hydroxy-3-methylphenyl)propane, 2,2-bis(4-hydroxy-3-ethylphenyl)propane, 2,2-bis(4-hydroxy-3-isopropylphenyl)propane, 2,2-bis(4-hydroxy-3,5-dimethylphenyl)propane, 2,2-bis(3,5,3',5'-tetrachloro-4,4'-dihydroxyphenyl)propane, bis(4-hydroxyphenyl)cyclohexylmethane, 2,2-bis(4-hydroxyphenyl)-1-phenylpropane, 2,4'-dihydroxyphenyl sulfone, 4,4'-dihydroxydiphenylsulfone (BPS), BPF, 4,4'-dihydroxy-1,1-biphenyl, 2,6dihydroxynaphthalene; hydroquinone; resorcinol, $C_{1-3}$ alkyl-substituted resorcinols, 3-(4-hydroxyphenyl)-1,1,3-trimethylindan-5-ol, 1-(4-hydroxyphenyl)-1,3,3-trimethylindan-5-ol, and 2,2,2',2'-tetrahydro-3,3,3',3'-tetramethyl-1,1'-spirobi[1 H-indene]-6,6'-diol; and
    bismethylsalicyl carbonate (BMSC);
    wherein the catalyst comprises:
    (a) an alpha catalyst selected from the group consisting of alkali metal salts and alkaline earth metal salts; and
    (b) a beta catalyst selected from the group consisting of quaternary ammonium compound and a quaternary phosphonium compounds.

41. A composition comprising a copolycarbonate, wherein said copolycarbonate is prepared by reacting together, in the presence of a catalyst, one or more aliphatic diols of the formula I:

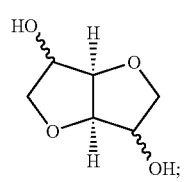

(I)

one or more aromatic dihydroxy compounds of the formula II:

HO-A-OH                                      (II);

and one or more activated diaryl carbonate of the formula III:

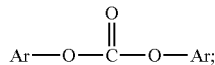

(III)

wherein A is an aromatic radical and Ar is a substituted aromatic radical having from 6 to 30 carbon atoms; said copolycarbonate comprises random arrangement of said structural units derived from the aliphatic diol and said aromatic hydroxy compounds; and said copolycarbonate further comprises structural units indicative of the activated carbonate.

42. A composition comprising a polycarbonate, wherein said polycarbonate is prepared by reacting together, in the presence of a catalyst, one or more aliphatic diols of the formula I:

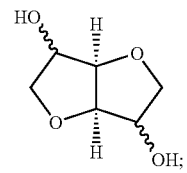

(I)

and one or more activated diaryl carbonate of the formula III:

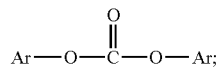

(III)

wherein Ar is a substituted aromatic radical having from 6 to 30 carbon atoms; said polycarbonate comprises random arrangement of said structural units derived from the aliphatic diol and the aromatic hydroxy compounds; and said copolycarbonate further comprises structural units indicative of the activated carbonate.

* * * * *